US012505948B2

(12) United States Patent
Yoshioka et al.

(10) Patent No.: US 12,505,948 B2
(45) Date of Patent: Dec. 23, 2025

(54) INDUCTOR COMPONENT AND METHOD OF MANUFACTURING SAME

(71) Applicant: Murata Manufacturing Co., Ltd., Kyoto-fu (JP)

(72) Inventors: Yoshimasa Yoshioka, Nagaokakyo (JP); Takahiro Ogoshi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 855 days.

(21) Appl. No.: 17/685,135

(22) Filed: Mar. 2, 2022

(65) Prior Publication Data

US 2022/0301759 A1 Sep. 22, 2022

(30) Foreign Application Priority Data

Mar. 17, 2021 (JP) ................................. 2021-043687

(51) Int. Cl.

| | |
|---|---|
| ***H01F 5/00*** | (2006.01) |
| ***H01F 27/28*** | (2006.01) |
| ***H01F 27/32*** | (2006.01) |
| ***H01F 41/04*** | (2006.01) |
| ***H01F 41/063*** | (2016.01) |

(52) U.S. Cl.

CPC ....... *H01F 27/2804* (2013.01); *H01F 27/323* (2013.01); *H01F 41/041* (2013.01); *H01F 41/063* (2016.01); *H01F 2027/2809* (2013.01)

(58) Field of Classification Search

CPC .................................................. H01F 27/2804
USPC .......................................................... 336/200
See application file for complete search history.

(56) References Cited

U.S. PATENT DOCUMENTS

| | | | | |
|---|---|---|---|---|
| 2003/0076211 A1* | 4/2003 | Matsuta | H01F 27/2804 336/200 |
| 2008/0290977 A1* | 11/2008 | Ito | H01F 17/0013 336/184 |
| 2018/0350499 A1* | 12/2018 | Matsuura | H01G 4/232 |

FOREIGN PATENT DOCUMENTS

| | | | |
|---|---|---|---|
| CN | 109300643 | A | 2/2019 |
| JP | 2010-080550 | A | 4/2010 |
| JP | 2016-139786 | A | 8/2016 |
| JP | 2019-029372 | A | 2/2019 |

* cited by examiner

*Primary Examiner* — Ronald Hinson
(74) *Attorney, Agent, or Firm* — Studebaker Brackett PLLC

(57) ABSTRACT

An inductor component comprising an element body having laminated insulating layers; a coil in the element body and wound into a helical shape advancing in a lamination direction of the insulating layers; and a substrate on an upper surface of the element body. The coil includes coil wirings along the lamination direction and wound along a plane orthogonal to the lamination direction, and a connection wiring connecting end portions of the coil wirings. The coil wirings include a winding part wound on the plane and a lead-out part from an end portion of the winding part to the connection wiring which is one of connection wirings arranged in the lamination direction. In the lamination direction, a lowest position of an upper surface of the connection wiring of the uppermost layer is lower than a bottom surface of the winding part in the coil wiring of the uppermost layer.

18 Claims, 23 Drawing Sheets

INDUCTOR COMPONENT AND METHOD OF MANUFACTURING SAME

CROSS REFERENCE TO RELATED APPLICATION

This application claims benefit of priority to Japanese Patent Application 2021-043687, filed Mar. 17, 2021, the entire content of which is incorporated herein by reference.

BACKGROUND

Technical Field

The present disclosure relates to an inductor component and a method of manufacturing the same.

Background Art

A conventional inductor component is described in Japanese Laid-Open Patent Publication No. 2016-139786. This inductor component includes an element body having multiple laminated insulating layers, a coil disposed in the element body and wound into a helical shape advancing in a lamination direction of the insulating layers. The coil has multiple coil wirings arranged along the lamination direction and wound along a plane orthogonal to the lamination direction, and multiple connection wirings connecting end portions of the multiple coil wirings to each other.

SUMMARY

However, in the conventional inductor component, the connection wirings are arranged offset from each other when viewed in the lamination direction of the insulating layers. Therefore, in a plane orthogonal to the lamination direction, a space for arranging the coil wiring becomes small, and as a result, the number of turns of the coil wirings decreases, or the diameter of the coil wirings becomes small, so that an inductance acquisition efficiency may decrease.

Therefore, the present disclosure is to provide an inductor component capable of improving an inductance acquisition efficiency.

Accordingly, an aspect of the present disclosure provides an inductor component comprising an element body having a plurality of laminated insulating layers; a coil disposed in the element body and wound into a helical shape advancing in a lamination direction of the insulating layers; and a substrate disposed on an upper surface of the element body. The coil includes a plurality of coil wirings arranged along the lamination direction and wound along a plane orthogonal to the lamination direction, and a connection wiring connecting end portions of the plurality of coil wirings to each other. The coil wirings include a winding part wound on the plane and a lead-out part led out from an end portion of the winding part to the connection wiring. The connection wiring is one of a plurality of connection wirings arranged in the lamination direction. In the lamination direction, a lowest position of an upper surface of the connection wiring of the uppermost layer in the lamination direction is lower than a position of a bottom surface of the winding part in the coil wiring of the uppermost layer. The lead-out part of the coil wiring of the uppermost layer is led out to the lower side in the lamination direction relative to the plane disposed with the winding part of the coil wiring of the uppermost layer and is connected to the connection wiring of the uppermost layer and inclined relative to the plane.

According to the embodiment, since the multiple connection wirings are arranged in the lamination direction, a space on a plane for arranging the coil wiring can be increased. Therefore, the number of turns of the coil wiring can be increased, and the diameter of the coil wiring can be increased, so that the inductance acquisition efficiency can be improved.

Since the lowest position of the upper surface of the connection wiring of the uppermost layer is lower than the position of the bottom surface of the winding part in the coil wiring of the uppermost layer, the thickness of the insulating layer on the connection wiring of the uppermost layer is larger than the thickness of the insulating layer on the winding part in the coil wiring of the uppermost layer. This can suppress a decrease in the adhesion between the element body and the substrate disposed on the element body, which may occur when multiple connection wirings are arranged in the lamination direction.

If the number of turns of the winding part of the coil wiring is increased by utilizing the large space on the plane for arranging the coil wiring so as to maximize the size of the coil wiring on the plane, the line length of the lead-out part may be shortened, and the inductance acquisition efficiency may be lowered. According to the embodiment, the lead-out part of the coil wiring of the uppermost layer is inclined relative to the plane. Therefore, the line length of the lead-out part can be ensured, so that a decrease in the inductance acquisition efficiency can be suppressed.

Preferably, in an embodiment of the inductor component, the lowest position of the upper surface of the connection wiring of the uppermost layer is higher than a position of the bottom surface of the winding part in the coil wiring one layer below the uppermost layer in the lamination direction.

According to the embodiment, a level difference is reduced between the connection wiring of the uppermost layer and the winding part of the coil wiring of the uppermost layer, so that the disconnection of the connection wiring and the lead-out part can be suppressed.

Preferably, in an embodiment of the inductor component, the lead-out part of the coil wiring of the lowermost layer in the lamination direction is parallel to the plane, and the lead-out part of the coil wiring located in an upper layer in the lamination direction has a larger inclination angle relative to the plane.

The "inclination angle" refers to an acute one of the angles formed by a line connecting both ends of the center line of the lead-out part and the plane in a cross section parallel to the lamination direction and intersecting with all the connection wirings arranged in the lamination direction and all the lead-out parts connected to these connection wirings.

According to the embodiment, since the winding part of the coil wiring of the lowermost layer is disposed on the same plane as the connection wiring of the lowermost layer, the winding part of the coil wiring and the connection wiring of the lowermost layer can be manufactured in the same process, so that the total number of processes can be suppressed as compared to the case that the winding part is not disposed on the same plane. Since the lead-out parts have a larger inclination angle when located in an upper layer in the lamination direction, the line lengths of the lead-out parts can more effectively be ensured.

Preferably, in an embodiment of the inductor component, the thickness of the insulating layer between the winding parts of the adjacent coil wirings is smaller than the thickness of the winding parts in the lamination direction.

The connection wiring is formed by filling a via opening disposed in the insulating layer with a conductor portion. In this case, the connection wiring is controlled such that a concave portion is formed on the upper surface of the connection wiring. If the depth of the concave portion becomes excessively deep, the possibility of disconnection of the connection wiring and the coil wiring increases. According to the embodiment, since the thickness of the insulating layer between the winding parts of the adjacent coil wirings is relatively thin, the depth of the via opening is also relatively small. Therefore, the depth of the concave portion of the connection wiring can be prevented from becoming excessively deep, and the disconnection of the connection wiring and the coil wiring can be suppressed.

Preferably, in an embodiment of the inductor component, the width of the connection wiring is larger than the width of the winding part.

The width of the connection wiring refers to the diameter of an inscribed circle fitted within the outer circumferential edge of the connection wiring when viewed in the lamination direction. The width of the winding part refers to the width in the direction orthogonal to the extending direction of the winding part when viewed in the lamination direction.

According to the embodiment, since the width of the connection wiring is larger than the width of the winding part of the coil wiring, the connection strength between the connection wirings can be increased. Additionally, the resistance to electromigration can be improved.

Preferably, in an embodiment of the inductor component, the coil is one of a plurality of coils, the plurality of the connection wirings arranged in the lamination direction are connected to each other to form a laminated body, and each of the plurality of the coils has the laminated body.

The phrase "the coil is one of a plurality of coils" means that multiple coils electrically independent of each other are present in the inductor component. According to the embodiment, a common mode choke coil, a transformer, an inductor array, etc. can be formed.

Preferably, in an embodiment of the inductor component, the plurality of the coils includes a first coil and a second coil having line lengths different from each other, and the width of a portion of the coil wiring of the first coil is different from the width of the coil wiring of the second coil.

According to the embodiment, the characteristics of the first coil and the second coil can be matched.

Preferably, in an embodiment of the inductor component, the thickness of each of the laminated bodies is the same.

According to the embodiment, since the thickness of each of the laminated bodies is the same, a bias of conductor distribution in the inductor component can be reduced, and a residual stress of the inductor component can be reduced. As a result, the strength of the inductor component can be increased.

Preferably, in an embodiment of the inductor component, the plurality of the coils includes a first coil and a second coil. In the first coil, the winding part of the coil wiring is spirally wound, and a shortest distance between the winding part of the first coil and the laminated body of the second coil is larger than a distance between adjacent turns of the winding part of the first coil.

While the voltage difference between adjacent turns of the winding part of the first coil can generally be considered as the same potential, different voltages may be applied in terms of the voltage difference between the first coil and the second coil. According to the embodiment, the shortest distance between the winding part of the first coil and the laminated body is larger than the distance between adjacent turns of the winding part of the first coil, so that the dielectric strength between the coils can be improved.

Preferably, in an embodiment of the inductor component, the inductor component further comprises a dummy wiring connected to an end portion of the winding part, and the dummy wiring extends from the end portion of the winding part along an extending direction of the winding part and does not constitute a current path.

According to the embodiment, since the dummy wiring is further included, a depression of the insulating layer laminated on the dummy wiring is suppressed, and the disconnection of the coil wiring disposed above the dummy wiring can be suppressed.

Preferably, in an embodiment of the inductor component, the dummy wiring is not connected to the coil wiring of the uppermost layer.

According to the embodiment, the magnetic path can be widened by not disposing the dummy wiring corresponding to the coil wiring of the uppermost layer.

Preferably, in an embodiment of the inductor component, the line length of the dummy wiring connected to the end portion of the winding part in the coil wiring of the lowest layer in the lamination direction is shorter than the line length of the dummy wiring connected to the end portion of the winding part in the coil wiring other than the coil wiring of the lowest layer.

According to the embodiment, the magnetic path can be widened by making the line length of the dummy wiring corresponding to the coil wiring of the lowermost layer relatively short.

Preferably, in an embodiment of the inductor component, the substrate is a magnetic substrate, the element body includes a through-hole penetrating in the lamination direction in a region radially inside the coil, an internal magnetic path member disposed in the through-hole and constituting an internal magnetic path is further included, and the internal magnetic path member contains a magnetic material different from the substrate.

According to the embodiment, the internal magnetic path member is further included, so that the effective relative magnetic permeability becomes higher, and the inductance acquisition efficiency can be improved.

Preferably, in an embodiment of the inductor component, the internal magnetic path member is made of a composite material of a metal magnetic powder and a resin, and an adhesion layer made of a composite material of a resin and a metal magnetic powder having an average particle size of ½ or less of the average particle size of the metal magnetic powder in the internal magnetic path member is included between the winding part of the coil wiring of the uppermost layer and the substrate in the lamination direction.

According to the embodiment, since the internal magnetic path member is made of a composite material of a metal magnetic powder and a resin, the effective relative magnetic permeability becomes higher, and the inductance acquisition efficiency can be improved. Further, since the adhesion layer contains a resin, the adhesion between the substrate and the element body can be improved.

Preferably, in an embodiment of the inductor component, the inductor component further comprises a substrate disposed on a lower surface of the element body and having a thickness greater than that of the substrate.

According to the embodiment, when the substrates disposed on the upper surface and the lower surface of the element body are magnetic substrates, a closed magnetic path can be formed.

Preferably, in an embodiment of the inductor component, the thickness of the winding part located on the upper side in the lamination direction is thinner than the thickness of the winding part located on the lower side.

According to the embodiment, the unevenness of the insulating layer on the upper layer side can be suppressed.

An embodiment of a method of manufacturing an inductor component is the method comprising the steps of laminating a first coil wiring and a first connection wiring on a first insulating layer; laminating a second insulating layer on the first coil wiring and the first connection wiring so that at least a portion of an upper surface of the first connection wiring is exposed; and laminating a second coil wiring and a second connection wiring on the second insulating layer so that the second connection wiring comes into contact with the upper surface of the first connection wiring. The second coil wiring is formed so that a lead-out part led out toward the second connection wiring is inclined.

According to the embodiment, the inductor component according to an embodiment of the present disclosure can be manufactured.

According to the inductor component of an aspect of the present disclosure, the inductance acquisition efficiency can be improved.

DETAILED DESCRIPTION

An inductor component of an aspect of the present disclosure will now be described in detail with reference to shown embodiments. The drawings include schematics and may not reflect actual dimensions or ratios.

First Embodiment

Figure 1:
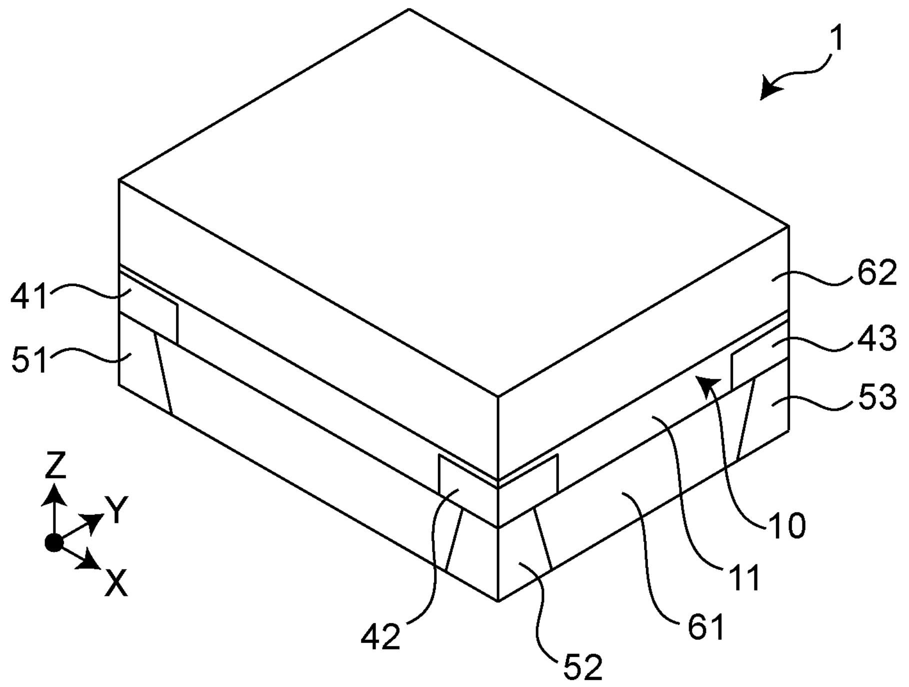
FIG. 1 is a perspective view showing an appearance of a first embodiment of an inductor component.
Figure 2:
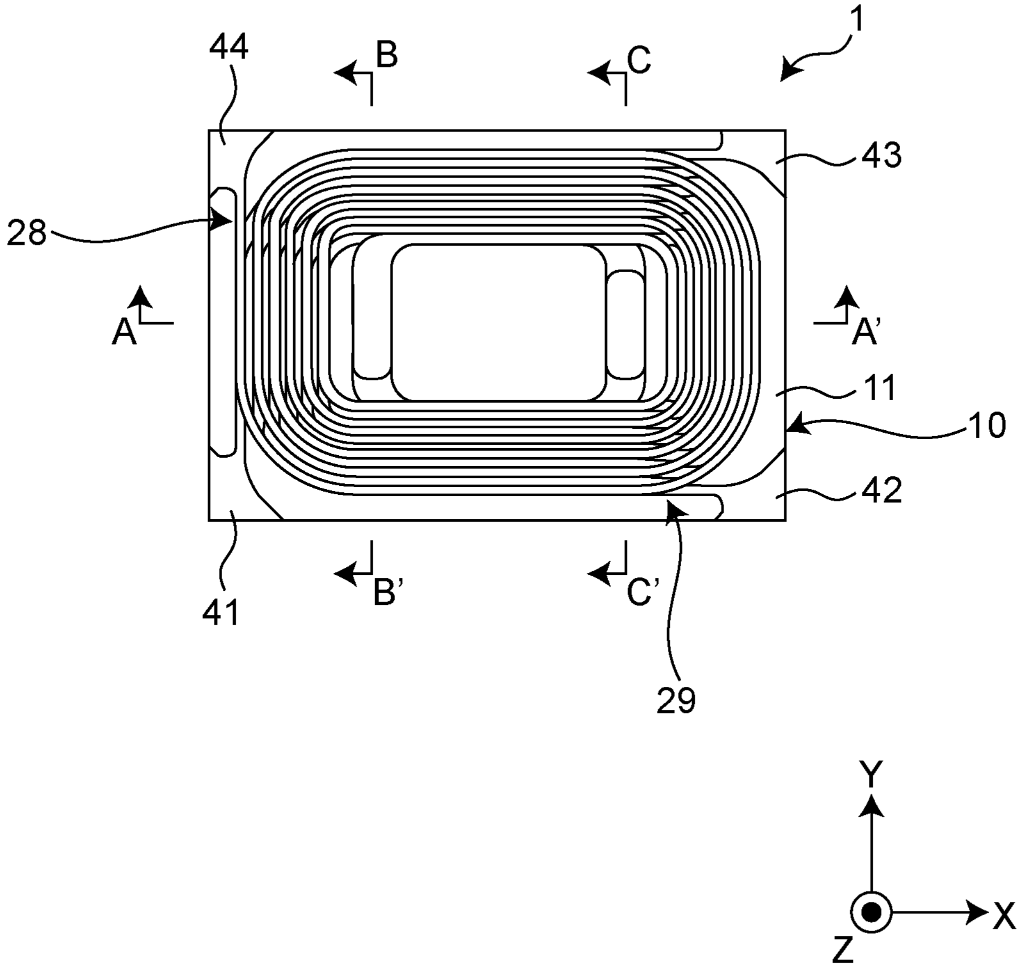
FIG. 2 is a transparent plan view of the inductor component.
Figure 3:
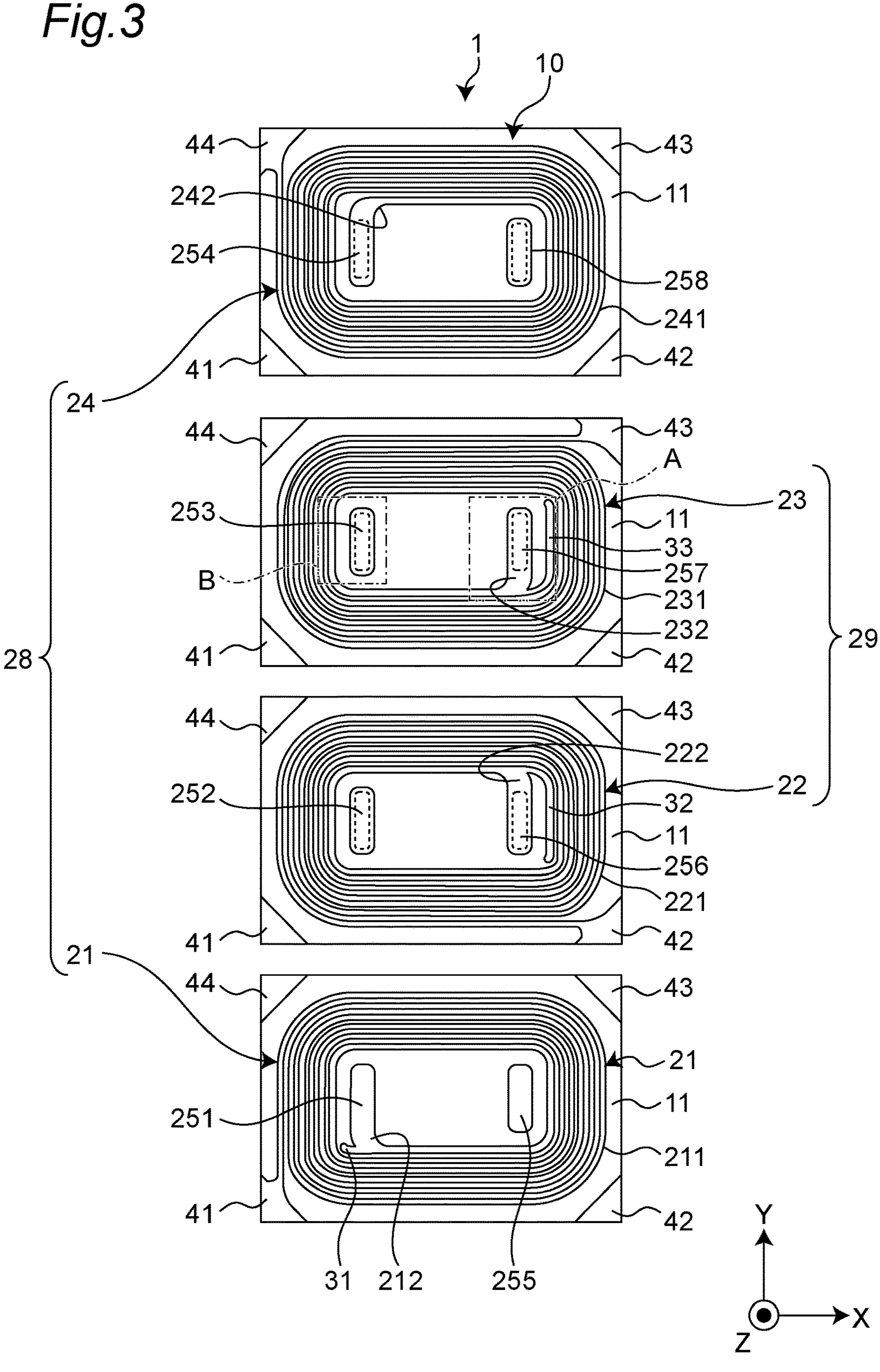
FIG. 3 is an exploded plan view of the inductor component.

FIG. 1 is a perspective view showing a first embodiment of an inductor component. FIG. 2 is a transparent plan view of the inductor component. FIG. 3 is an exploded plan view of the inductor component. As shown in the figures, the lamination direction of insulating layers 11 (hereinafter, simply referred to as "lamination direction") is defined as a Z direction, and a direction of extension of a long side of an element body 10 is defined as an X direction and a direction of extension of the short side is defined as a Y direction when viewed in the Z direction. In this description, the lamination direction (Z direction) is a vertical direction. FIG. 3 shows layers in order from an upper layer to a lower layer. The lamination direction merely shows an order in a process, and the top and bottom of an inductor component 1 may be reversed (configuration in which external electrodes are on the upper side).

As shown in FIGS. 1 to 3, the inductor component 1 includes an element body 10, a first substrate 61 disposed on a lower surface of the element body 10, and a second substrate 62 disposed on an upper surface of the element body 10, a first coil 28 and a second coil 29 disposed in the element body 10, a first connection electrode 41 and a fourth connection electrode 44 disposed on the element body 10 and electrically connected to the first coil 28, a second connection electrode 42 and a third connection electrode 43 disposed on the element body 10 and electrically connected to the second coil 29, and a first external electrode 51, a second external electrode 52, a third external electrode 53, and a fourth external electrode 54 disposed on the first substrate 61 (the fourth external electrode 54 is not shown). The first connection electrode 41 is connected to the first external electrode 51, the second connection electrode 42 is connected to the second external electrode 52, the third connection electrode 43 is connected to the third external electrode 53, and the fourth connection electrode 44 is connected to the fourth external electrode 54.

The inductor component 1 is electrically connected through the first to fourth connection electrodes 41 to 44 and the first to fourth external electrodes 51 to 54 to a wiring of a circuit board not shown. The inductor component 1 is used as a common mode choke coil, for example, and is used for an electronic device such as a personal computer, a DVD player, a digital camera, a TV, a portable telephone, automotive electronics, and medical/industrial machines.

The element body 10 includes multiple insulating layers 11, and the multiple insulating layers 11 are laminated. The insulating layer 11 is made of an insulating material mainly composed of resin, ferrite, and glass, for example. In the element body 10, an interface between the multiple insulating layers 11 may not be clear due to firing etc. The element body 10 is formed into a substantially rectangular parallelepiped shape.

The first substrate 61 and the second substrate 62 are ferrite substrates, for example. The first substrate 61 and the second substrate 62 have a rectangular shape when viewed in the lamination direction. Preferably, the thickness of the first substrate 61 is greater than the thickness of the second substrate 62. The ferrite material used for the first substrate 61 and the second substrate 62 may be a magnetic material or a non-magnetic material, and in the case of a magnetic material, the effective relative magnetic permeability is high, and the inductance acquisition efficiency can be improved. When the first substrate 61 and the second substrate 62 are made of a magnetic material, a closed magnetic path can be formed. The first substrate 61 and the second substrate 62 may be made of a material other than ferrite such as alumina and glass. The first substrate 61 and the second substrate 62 can increase the strength of the inductor component 1.

For example, the first to fourth connection electrodes 41 to 44 and the first to fourth external electrodes 51 to 54 are made of a conductive material such as Ag, Cu, Au, and an alloy mainly composed thereof, for example. The first to fourth connection electrodes 41 to 44 are each embedded in a corner of the element body 10 along the lamination direction. The first to fourth external electrodes 51 to 54 are disposed from the lower surface to the side surfaces of the first substrate 61.

By using one and the other of the first external electrode 51 and the fourth external electrode 54 as an input terminal and an output terminal, respectively, and using one and the other of the second external electrode 52 and the third external electrode 53 as an input terminal and an output terminal, respectively, an electric connection of the inductor component 1 can be achieved. The first external electrode 51 and the fourth external electrode 54 are disposed on two respective opposite sides of the quadrangular shape of the first substrate 61 when viewed in the lamination direction, and the second external electrode 52 and the third external electrode 53 are disposed on two respective opposite sides of the quadrangular shape of the first substrate 61. Therefore, the input terminals and the output terminals can be arranged on the opposite sides, which makes wiring design easy.

The first coil 28 has a first coil wiring 21 and a fourth coil wiring 24, and a first connection wiring 251, a second connection wiring 252, a third connection wiring 253, and a fourth connection wiring 254. The first coil wiring 21 and the fourth coil wiring 24 are arranged along the lamination direction and wound along a plane orthogonal to the lamination direction. The fourth coil wiring 24 is arranged on the upper side of the first coil wiring 21 in the lamination direction. A first end portion of the first coil wiring 21 is connected to the first connection electrode 41, and a first end portion of the fourth coil wiring 24 is connected to the fourth connection electrode 44. The first to fourth connection wirings 251 to 254 are laminated in this order and connected to each other. The first connection wiring 251 is connected to a second end portion of the first coil wiring 21. The fourth connection wiring 254 is connected to a second end portion of the fourth coil wiring 24. With the configuration described above, the first connection electrode 41, the first coil wiring 21, the first to fourth connection wirings 251 to 254, the fourth coil wiring 24, and the fourth connection electrode 44 are connected in this order, and the first coil 28 is electrically connected to the first connection electrode 41 and the fourth connection electrode 44. The term “plane” as used herein includes not only a completely flat surface but also a slightly curved surface. The phrase “winding along a plane” means not only being wound on a plane but also being wound while being moved up and down relative to the plane.

The first coil wiring 21 is made of the same conductive material as the first to fourth connection electrodes 41 to 44 and the first to fourth external electrodes 51 to 54, for example. The first coil wiring 21 has a winding part 211 wound on a plane orthogonal to the lamination direction and a lead-out part 212 led out from a first end portion of the winding part 211 to the first connection wiring 251.

The winding part 211 has a flat spiral shape wound in a spiral shape on a plane. The number of turns of the winding part 211 is not less than one or may be less than one. A second end portion of the winding part 211 is connected to the first connection electrode 41.

The lead-out part 212 is a portion from the first end portion of the winding part 211 to a portion connected to the first connection wiring 251. The lead-out part 212 and the winding part 211 are integrally formed.

Similar to the first coil wiring 21, the fourth coil wiring 24 has a winding part 241 wound on a plane orthogonal to the lamination direction and a lead-out part 242 led out from a first end portion of the winding part 241 to the fourth connection wiring 254. The winding part 241 and the lead-out part 242 of the fourth coil wiring 24 have the same configurations as the winding part 211 and the lead-out part 212 of the first coil wiring 21 and therefore will not be described in detail.

The first to fourth connection wirings 251 to 254 are made of the same conductive materials as the first to fourth connection electrodes 41 to 44 and the first to fourth external electrodes 51 to 54, for example. Each of the first to fourth connection wirings 251 to 254 is disposed on a plane orthogonal to the lamination direction. The shapes of the first to fourth connection wirings 251 to 254 are not particularly limited. In this embodiment, each of the first to fourth connection wirings 251 to 254 has an oval shape extending in the Y direction when viewed in the lamination direction.

The second coil 29 has a second coil wiring 22 and a third coil wiring 23, and a sixth connection wiring 256 and a seventh connection wiring 257. The second coil wiring 22 and the third coil wiring 23 are arranged along the lamination direction and wound along a plane orthogonal to the lamination direction. The second coil wiring 22 and the third coil wiring 23 are arranged between the first coil wiring 21 and the fourth coil wiring 24 in the lamination direction. The third coil wiring 23 is arranged on the upper side of the second coil wiring 22 in the lamination direction. A first end portion of the second coil wiring 22 is connected to the second connection electrode 42, and a first end portion of the third coil wiring 23 is connected to the third connection electrode 43. The sixth connection wiring 256 and the seventh connection wiring 257 are laminated in this order and connected to each other. The sixth connection wiring 256 is connected to a second end portion of the second coil wiring 22. The seventh connection wiring 257 is connected to a second end portion of the third coil wiring 23. With the configuration described above, the second connection electrode 42, the second coil wiring 22, the sixth connection wiring 256, the seventh connection wiring 257, the third coil wiring 23, and the third connection electrode 43 are connected in this order, and the second coil 29 is electrically connected to the second connection electrode 42 and the third connection electrode 43. The second coil 29 is electrically independent of the first coil 28 and constitutes a common mode choke coil. Three or more coils may exist, and in this case, it is assumed that the coils are electrically independent of each other.

The second coil wiring 22 has a winding part 221 wound on a plane orthogonal to the lamination direction and a lead-out part 222 led out from a first end portion of the winding part 221 to the sixth connection wiring 256. The third coil wiring 23 has a winding part 231 wound on a plane orthogonal to the lamination direction and a lead-out part 232 led out from a first end portion of the winding part 231 to the seventh connection wiring 257. The winding part 221 and the winding part 231 each have the same configuration as the winding part 211 of the first coil wiring 21 and therefore will not be described in detail. The lead-out part 222 and the lead-out part 232 each have the same configuration as the lead-out part 212 of the first coil wiring 21 and therefore will not be described in detail. The sixth connection wiring 256 and the seventh connection wiring 257 have the same configuration as the first to fourth connection wirings 251 to 254 and therefore will not be described in detail.

Figure 4A:
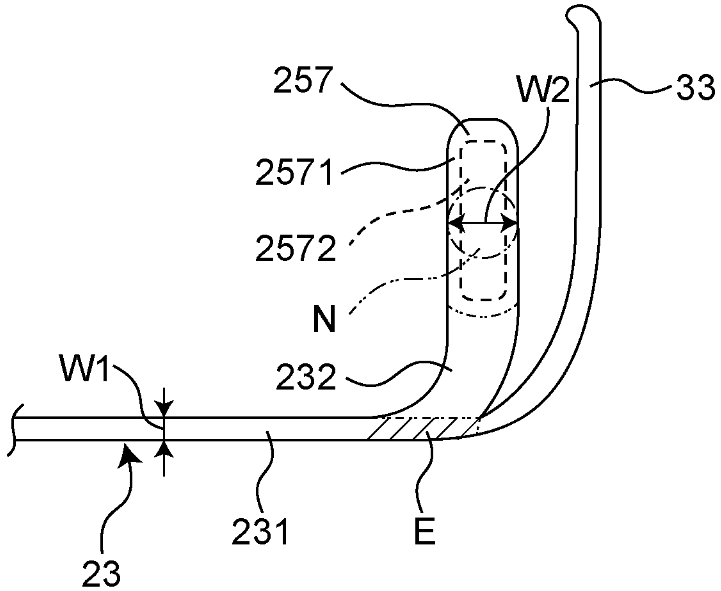
FIG. 4A is an enlarged view of a region A of FIG. 3.

A positional relationship of the winding part and the lead-out part of the coil wiring with the connection wiring in a plane will be described by taking the third coil wiring 23 as an example. The following description is the same for the first coil wiring 21, the second coil wiring 22, and the fourth coil wiring 24. FIG. 4A is an enlarged view of a region A of FIG. 3. As shown in FIG. 4A, the lead-out part 232 of the third coil wiring 23 extends from an end portion E (a portion indicated by diagonal lines in FIG. 4A) of the winding part 231, i.e., the end portion E of a portion constituting a turn of the third coil wiring 23 and is connected to the seventh connection wiring 257. The lead-out part 232 and the seventh connection wiring 257 are integrally formed.

The seventh connection wiring 257 includes a via pad 2571 and a via 2572. The via pad 2571 is a main body portion of the seventh connection wiring 257. The via pad 2571 has an oval shape extending in the Y direction when viewed in the lamination direction. The via 2572 has an oval shape extending in the Y direction when viewed in the lamination direction and has a diameter smaller than the via pad 2571. The via 2572 is a portion extending from a part of a lower surface of the via pad 2571 to the lower side in the lamination direction to connect a via pad adjacent in the lamination direction. The via pad 2571 and the via 2572 are integrally formed. In the seventh connection wiring 257, the via pad 2571 is connected to the lead-out part 232. The via and the via pad are integrally formed and therefore may not have a confirmable interface.

A width W2 of the seventh connection wiring 257 is preferably greater than a width W1 of the winding part 231. As a result, the connection strength between the connection wirings can be increased. Additionally, the resistance to electromigration can be improved. The width W2 of the seventh connection wiring 257 refers to the diameter of an inscribed circle N fitted within the outer circumferential edge of the seventh connection wiring 257 when viewed in the lamination direction. The width W1 of the winding part 231 refers to the width in the direction orthogonal to the extending direction of the winding part 231 when viewed in the lamination direction.

Figure 4B:
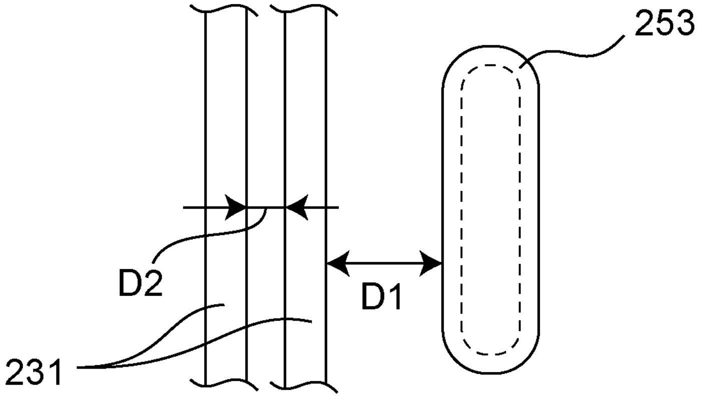
FIG. 4B is an enlarged view of a region B of FIG. 3.

FIG. 4B is an enlarged view of a region B of FIG. 3. The winding part 231 is disposed on the same insulating layer 11 as the third connection wiring 253. The winding part 231 is electrically independent of the third connection wiring 253. As shown in FIG. 4B, a shortest distance D1 between the winding part 231 and the third connection wiring 253 (i.e., a shortest distance between the winding part 231 and a laminated body made up of the first to fourth connection wirings 251 to 254) is preferably greater than a distance D2 between adjacent turns of the winding part 231. The third connection wiring 253 is a portion of the first coil 28, and the winding part 231 is a portion of the second coil 29. The first coil 28 and the second coil 29 are electrically independent and may have different voltages applied thereto. According to the configuration described above, the shortest distance between the winding part 231 of the first coil 28 and the laminated body made up of the connection wirings of the second coil 29 is greater than the distance between adjacent turns of the winding part 231, and therefore, even when different voltages are applied to the first coil 28 and the second coil 29, the insulation resistance between the first coil 28 and the second coil 29 can be improved.

Figure 5:
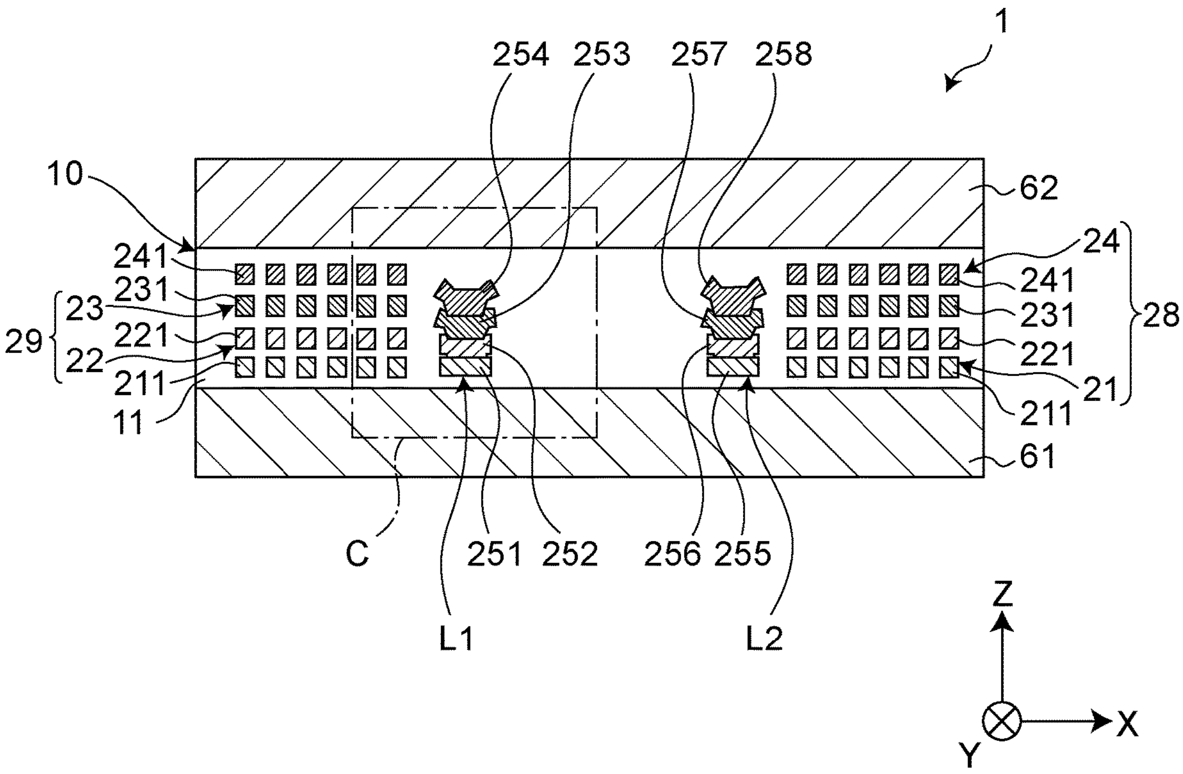
FIG. 5 is a cross-sectional view taken along a line A-A' of FIG. 2.

A positional relationship of the winding parts and the lead-out parts of the coil wirings with the connection wirings in the lamination direction will be described. FIG. 5 is a cross-sectional view taken along a line A-A' of FIG. 2. In FIG. 5, the cross section of the element body 10 is not hatched. The same applies to other cross-sectional views. As shown in FIG. 5, each of the first to fourth connection wirings 251 to 254 is laminated in this order from the lower side to the upper side in the lamination direction to form a laminated body L1. As a result, the laminated body L1 electrically connects the first coil wiring 21 and the fourth coil wiring 24. Similarly, each of the fifth to eighth connection wirings 255 to 258 is laminated in this order from the lower side to the upper side in the lamination direction to form a laminated body L2. As a result, the laminated body L2 electrically connects the second coil wiring 22 and the third coil wiring 23. The laminated body L1 and the laminated body L2 are electrically independent. By disposing the laminated bodies in this way, the multiple coil wirings can be connected, so that a common mode choke coil, a transformer, an inductor array, etc. can be formed.

The first connection wiring 251 and the fifth connection wiring 255 are disposed on the same insulating layer 11 on the same layer. The second connection wiring 252 and the sixth connection wiring 256 are disposed on the same insulating layer 11. The third connection wiring 253 and the seventh connection wiring 257 are disposed on the same insulating layer 11. The fourth connection wiring 254 and the eighth connection wiring 258 are disposed on the same insulating layer 11. The fifth connection wiring 255 and the eighth connection wiring 258 do not constitute the current path of the second coil 29. Specifically, although the fifth connection wiring 255 and the eighth connection wiring 258 are not included in the configuration of the second coil 29, preferably, the thickness of the laminated body L1 and the thickness of the laminated body L2 can be made identical by disposing the fifth connection wiring 255 and the eighth connection wiring 258. With this configuration, a bias of conductor distribution in the inductor component can be reduced, and a residual stress of the inductor component 1 can be reduced. As a result, the strength of the inductor component 1 can be increased.

Figure 6:
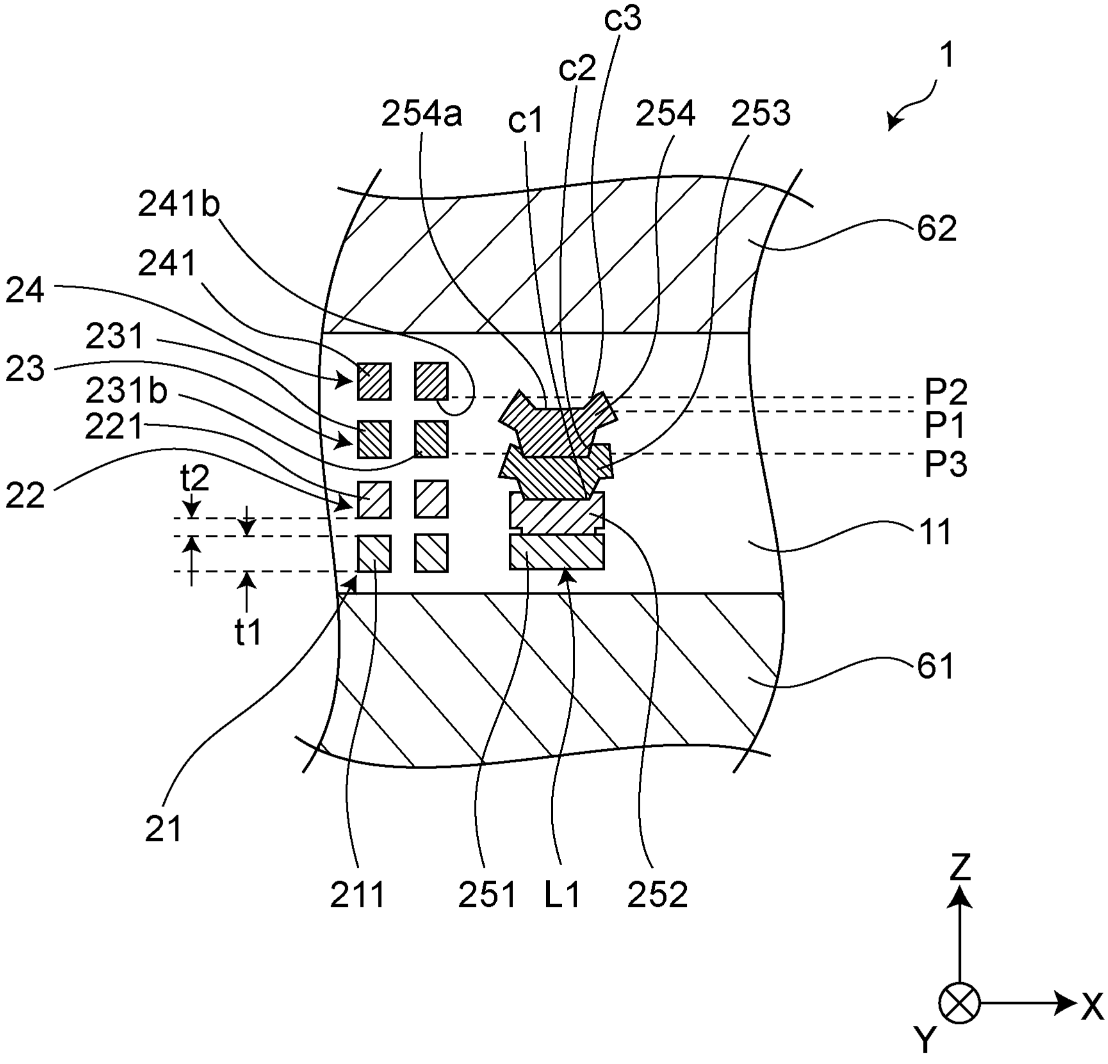
FIG. 6 is an enlarged view of a region C of FIG. 3.

FIG. 6 is an enlarged view of a region C of FIG. 5. The second to fourth connection wirings 252 to 254 are formed by filling via openings disposed in the insulating layers 11 with conductor portions. Specifically, the second to fourth connection wirings 252 to 254 are formed in the via openings and the insulating layers 11 around the via openings. In this case, each connection wiring is controlled such that a concave portion is formed on an upper surface of a portion corresponding to the via opening. Specifically, for example, an interval between the winding parts 211 to 231 and the first to third connection wirings 251 to 253 is made wider than a wiring interval in the winding parts 211 to 231, or the width of the first to third connection wirings 251 to 253 is made larger than the width of the winding parts 211 to 231. As a result, when a via opening is formed in the insulating layer 11 covering the winding part 231 and the third connection wiring 253, the opening diameter can be increased. In the photolithography method, a positive correlation exists between an exposed area (opening diameter of photoresist) and a depth that can be exposed (depth that light can reach in the insulating layer 11), i.e., a positive correlation exists between an opening diameter and an opening depth of a via. Therefore, if the via opening diameter is small, the via cannot be deepened, so that only the thin insulating layers 11 can be laminated. On the other hand, when the opening diameter of the via can be increased as described above, a sufficiently deep via opening can be formed even if the thickness of the insulating layer 11 is increased, and the via can be connected to the third connection wiring 253 in the lower layer. Therefore, the thickness of the insulating layer 11 covering the winding part 231 and the third connection wiring 253 can be increased. By forming the via opening in the insulating layer 11 having a certain thickness or more in this way, a level difference between the upper surface of the insulating layer 11 and the bottom surface of the via opening can be increased. Therefore, when the second to fourth coil wirings 22 to 24 and the second to fourth connection wirings 252 to 254 having an equivalent thickness are formed on the insulating layer 11 and in the via opening by printing or plating, clear concave portions can be formed in the second to fourth connection wirings 252 to 254.

For a method of forming the concave portion, the first to third connection wirings 251 to 253 of the lower layer exposed from the via opening by wet treatment such as desmear may partially be melted to lower the position of the bottom surface of the via opening. As shown in FIG. 6, among the first to fourth connection wirings 251 to 254 constituting the laminated body L1, each of the second to fourth connection wirings 252 to 254 excluding the first connection wiring 251 serving as the lowest layer has respective concave portions C1, C2, C3 disposed on the upper surface. The depth of the concave portions becomes deeper as the connection wiring exists on the upper side in the lamination direction. Therefore, the depth of the concave portions becomes deeper in the order of the concave portions C1, C2, C3. Due to the presence of the concave portions C1, C2, C3, a lowest position P1 of an upper surface 254*a* of the fourth connection wiring 254 in the uppermost layer in the lamination direction becomes lower than a position P2 of a bottom surface 241*b* of the winding part 241 in the fourth coil wiring 24 in the uppermost layer. Particularly, the concave portion C3 disposed on the upper surface of the fourth connection wiring 254 in the uppermost layer exerts an anchor effect and can enhance the adhesion between the fourth connection wiring 254 and the insulating layer 11 on the fourth connection wiring 254.

The "lowest position of an upper surface of a connection wiring" refers to a position on the bottom surface of the concave portion. Preferably, the lowest position P1 of the upper surface 254*a* of the fourth connection wiring 254 in the uppermost layer is higher than a position P3 of the bottom surface 231*b* of the winding part 231 in the coil wiring one layer below the uppermost layer in the lamination direction, i.e., in the third coil wiring 23. With this configuration, a level difference is reduced between the fourth connection wiring 254 in the uppermost layer and the winding part 241 of the coil wiring of the uppermost layer, i.e., the fourth coil wiring 24, so as to suppress disconnection that may occur in the fourth connection wiring 254 and the lead-out part 242 of the fourth coil wiring 24. The positional relationship between the upper surface of the connection wiring and the lower surface of the winding part described above is the same for the laminated body L2.

Preferably, in the lamination direction, the thickness of the insulating layer between the winding parts of the adjacent coil wirings is smaller than the thickness of the winding parts. Specifically, as shown in FIG. 6, in the first coil wiring 21 and the second coil wiring 22 adjacent to each other in the lamination direction, a thickness t2 of the insulating layer 11 between the winding part 211 and the winding part 221 is smaller than a thickness t1 of the winding part 211. If the depths of the concave portions C1 to C3 become excessively deep, the possibility of disconnection of the second to fourth connection wirings 252 to 254 and the second to fourth coil wirings 22 to 24 increases. According to the configuration described above, since the thickness of the insulating layer between the winding parts of the adjacent coil wirings is relatively thin, the depth of the via opening is also relatively small Therefore, the depth of the concave portion of the connection wiring can be prevented from becoming excessively deep, and the disconnection of the connection wiring and the coil wiring can be suppressed.

Figure 7:
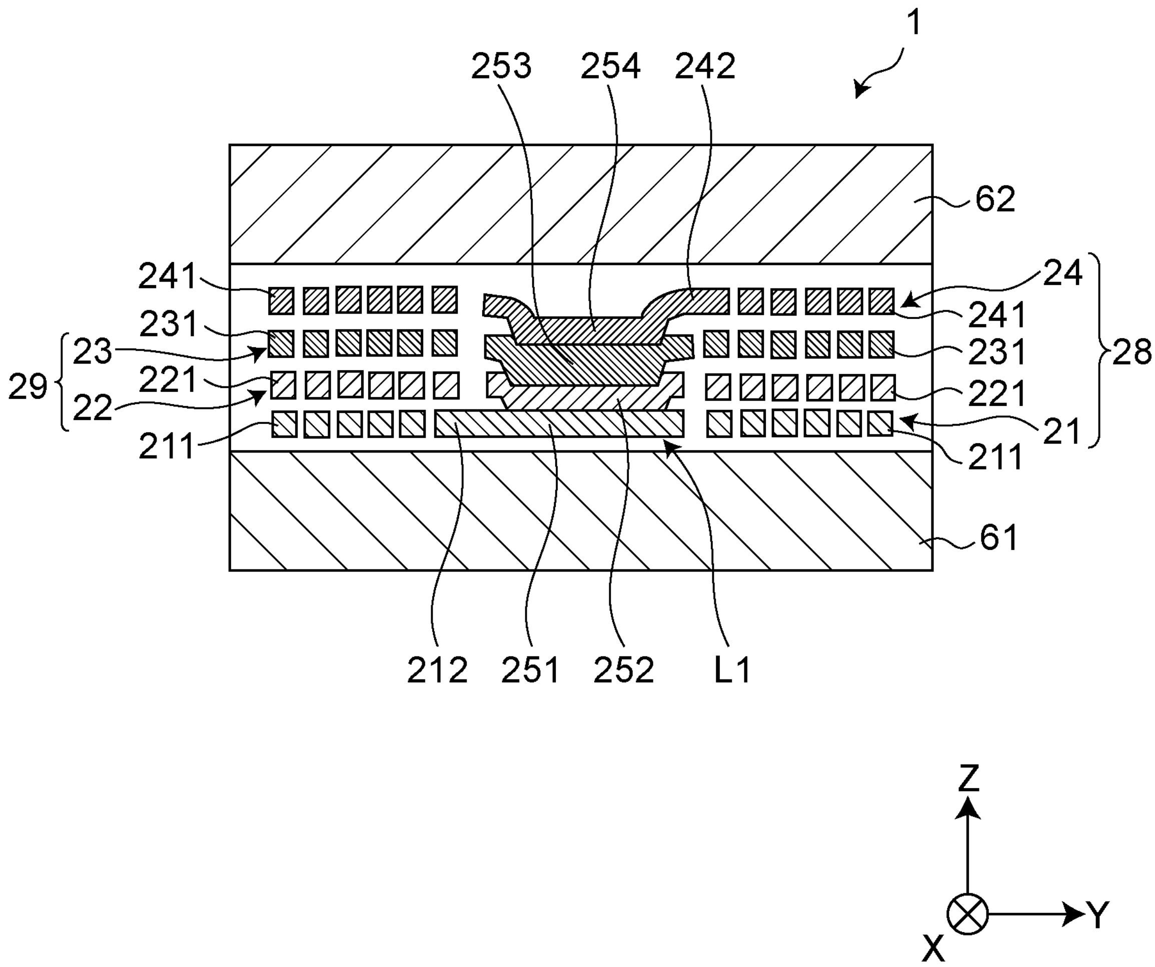
FIG. 7 is a cross-sectional view taken along a line B-B' of FIG. 2.
Figure 8:
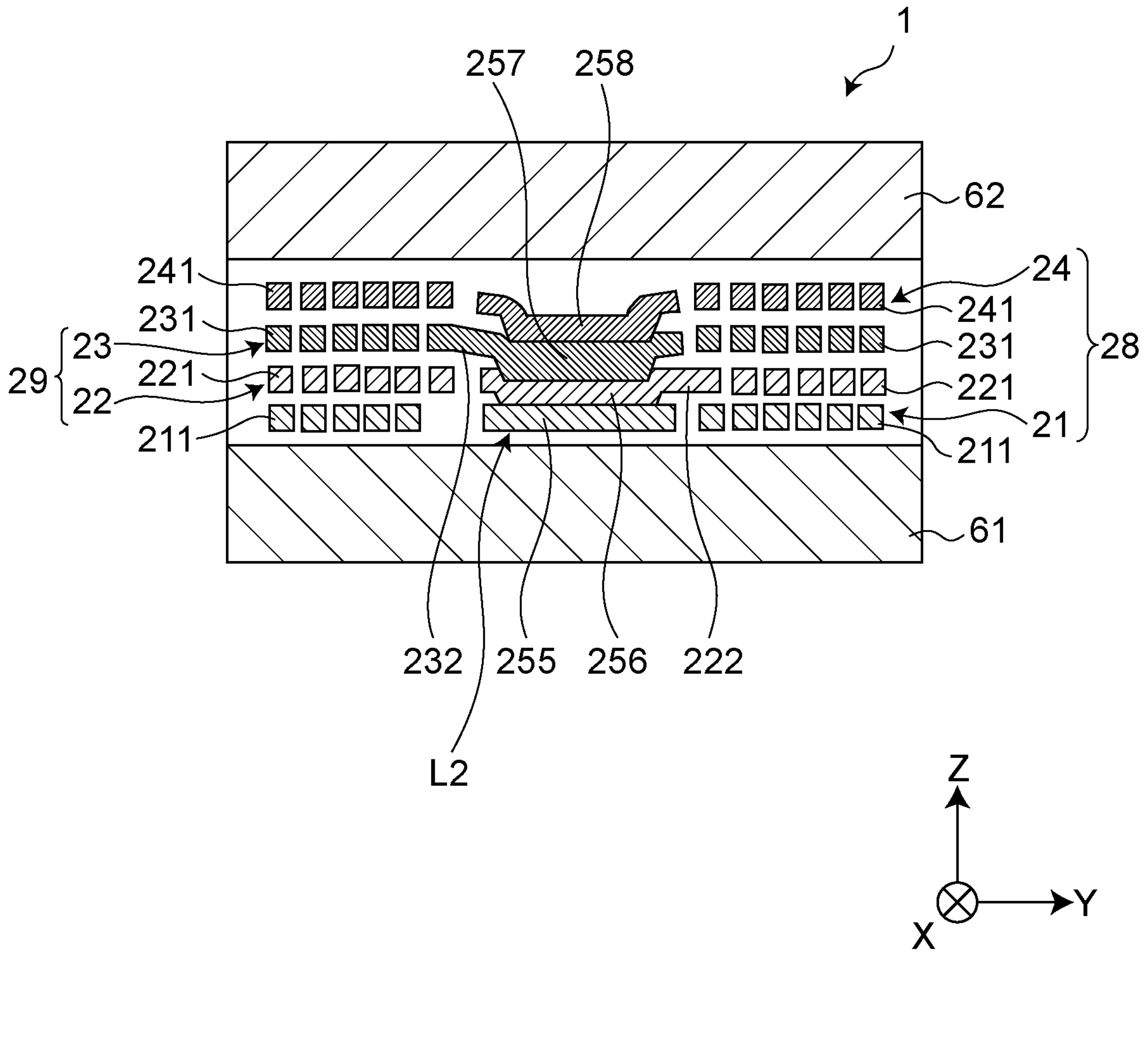
FIG. 8 is a cross-sectional view taken along a line C-C' of FIG. 2.

FIG. 7 is a cross-sectional view taken along a line B-B' of FIG. 2. FIG. 8 is a cross-sectional view taken along a line C-C' of FIG. 2. As described above, the first to fourth connection wirings 251 to 254 are laminated in this order from the lower side to the upper side in the lamination direction to form the laminated body L1. The fifth to eighth connection wirings 255 to 258 are laminated in this order from the lower side to the upper side in the lamination direction to form the laminated body L2. The lead-out part 242 of the fourth coil wiring 24 in the uppermost layer is led out to the lower side in the lamination direction relative to the plane disposed with the winding part 241 of the fourth coil wiring 24 and is connected to the fourth connection wiring 254 in the uppermost layer and inclined relative to the plane.

Preferably, the lead-out part 212 of the first coil wiring 21 of the lowermost layer in the lamination direction is parallel to the plane orthogonal to the lamination direction. Preferably, the lead-out part of the coil wiring located in the upper layer in the lamination direction has a larger inclination angle relative to the plane orthogonal to the lamination direction. The "inclination angle" refers to an acute one of the angles formed by a line connecting both ends of the center line of the lead-out part and the plane in a cross section parallel to the lamination direction and intersecting with all the connection wirings arranged in the lamination direction and all the lead-out parts connected to these connection wirings.

Specifically describing with reference to FIGS. 7 and 8, preferably, the respective inclination angles of the lead-out part 232 of the third coil wiring 23 and the lead-out part 242 of the fourth coil wiring 24 are greater than the inclination angle of the lead-out part 222 of the second coil wiring 22 located in the lower layer than the third coil wiring 23 and the fourth coil wiring 24. Preferably, the inclination angle of the lead-out part 242 of the fourth coil wiring 24 is larger than the inclination angle of the lead-out part 232 of the third coil wiring 23 located in the lower layer than the fourth coil wiring 24. According to the configuration described above, the winding part 211 of the first coil wiring 21 in the lowermost layer is disposed on the same plane as the first connection wiring 251 in the lowermost layer, and therefore, the winding part 211 and the first connection wiring 251 can be manufactured in the same process, so that the total number of processes can be suppressed as compared to the case that the winding part 211 is not disposed on the same plane. Since the lead-out parts 222, 232, 242 have a larger inclination angle when located in an upper layer in the lamination direction, the line lengths of the lead-out parts 222, 232, 242 can more effectively be ensured. The inclination angle of each of the lead-out parts 212, 222, 232, 242 may be increased stepwise from the lower side to the upper side in the lamination direction (i.e., in the order of the lead-out parts 212, 222, 232, 242).

A method of manufacturing the inductor component 1 will be described with reference to FIGS. 9A to 9F.

Figure 9A:
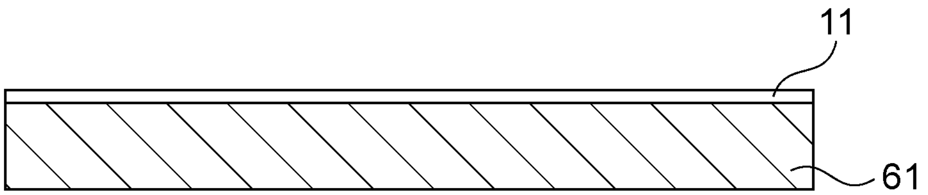
FIG. 9A is an explanatory view explaining a method of manufacturing an inductor component.
Figure 9B:
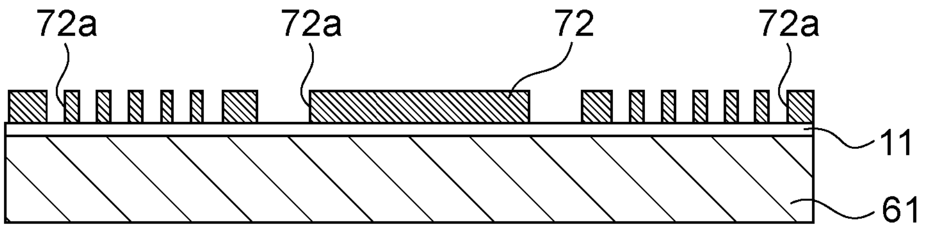
FIG. 9B is an explanatory view explaining the method of manufacturing an inductor component.
Figure 9C:
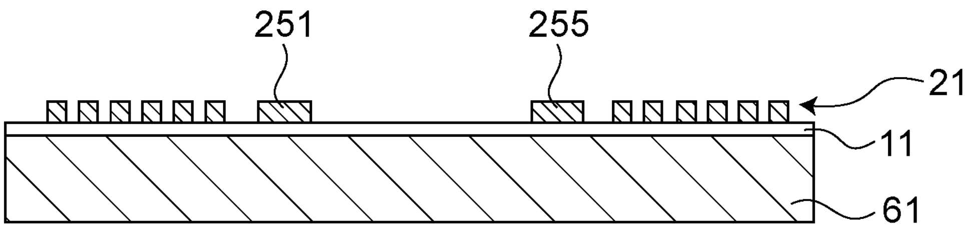
FIG. 9C is an explanatory view explaining the method of manufacturing an inductor component.

As shown in FIG. 9A, the insulating layer 11 is disposed on the first substrate 61. In this case, a conductive seed layer not shown is formed on the insulating layer 11 by a sputtering method etc. Subsequently, as shown in FIG. 9B, a photoresist 72 having an opening 72*a* formed by exposure and development is disposed on the insulating layer 11 including the seed layer. The photoresist 72 is a negative resist, for example Subsequently, as shown in FIG. 9C, while the first coil wiring 21, the first connection wiring 251, and the fifth connection wiring 255 are disposed in the opening 72*a* of the photoresist 72, the photoresist 72 is peeled off and the seed layer is removed by etching. As a result, the first coil wiring 21, the first connection wiring 251, and the fifth connection wiring 255 are laminated on the insulating layer 11. The first coil wiring 21, the first connection wiring 251, and the fifth connection wiring 255 are formed, for example, by electroplating with copper on the power-fed seed layer in the opening 72*a* of the photoresist 72. The wiring forming method is not limited to the method described above and the wirings may be formed by an additive method, a subtractive method, a sputtering method, a printing method, etc.

Figure 9D:
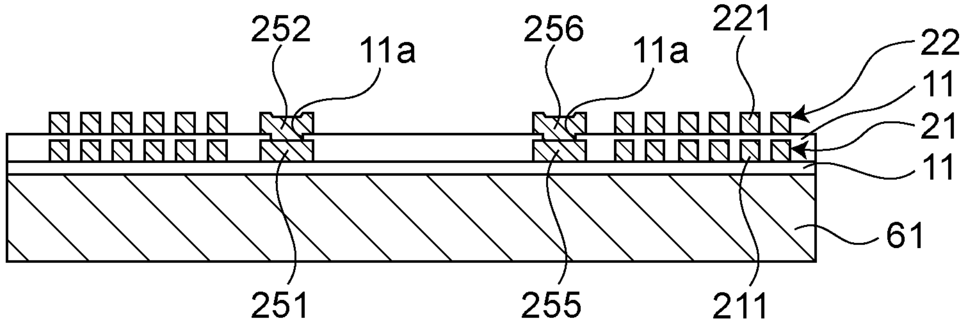
FIG. 9D is an explanatory view explaining the method of manufacturing an inductor component.

Subsequently, as shown in FIG. 9D, the insulating layer 11 having a via opening 11*a* formed therein is laminated on the first coil wiring 21, the first connection wiring 251, and the fifth connection wiring 255. The via opening 11*a* exposes a portion of the upper surface of the first connection wiring 251 and a portion of the upper surface of the fifth connection wiring 255. Subsequently, the second coil wiring 22, the second connection wiring 252, and the sixth connection wiring 256 are laminated on the insulating layer 11 so that the second connection wiring 252 and the sixth connection wiring 256 come into contact with the upper surfaces of the first connection wiring 251 and the fifth connection wiring 255. In this case, the second connection wiring 252 and the sixth connection wiring 256 are disposed on the via opening 11*a* and the insulating layer 11 around the via opening 11*a* and are controlled such that a concave portion is formed on the upper surface of the portion corresponding to the via opening 11*a* in the second connection wiring 252 and the sixth connection wiring 256. Specifically, an interval between the winding part 211 and the first and fifth connection wirings 251, 255 is made wider than a wiring interval in the winding part 211, or the width of the first and fifth connection wirings 251, 255 is made larger than the width of the winding part 211. Therefore, as described above, the thickness of the insulating layer 11 covering the winding part 211 and the first and fifth connection wirings 251,255 can be increased. By forming the via opening in the insulating layer 11 having a certain thickness or more in this way, a level difference between the upper surface of the insulating layer 11 and the bottom surface of the via opening can be increased. Therefore, when the second coil wiring 22 and the second and sixth connection wirings 252, 256 having the equivalent thickness are formed on the insulating layer 11 and in the via opening by printing or plating, clear concave portions can be formed in the second and sixth connection wirings 252, 256. For a method of forming the concave portion, the first, second, fifth, and sixth connection wirings 251, 252, 255, 256 exposed from the via opening by wet treatment such as desmear may partially be melted to lower the position of the bottom surface of the via opening. By forming the concave portion on the upper surface of the portion corresponding to the via opening 11*a* in the second connection wiring 252 and the sixth connection wiring 256, the lower surface of the second connection wiring 252 and the sixth connection wiring 256 is disposed lower side in the lamination direction relative to the lower surface of the winding part 221 of the second coil wiring 22. Therefore, the lead-out part connecting the winding part 221 and the sixth connection wiring 256 is inclined.

Figure 9E:
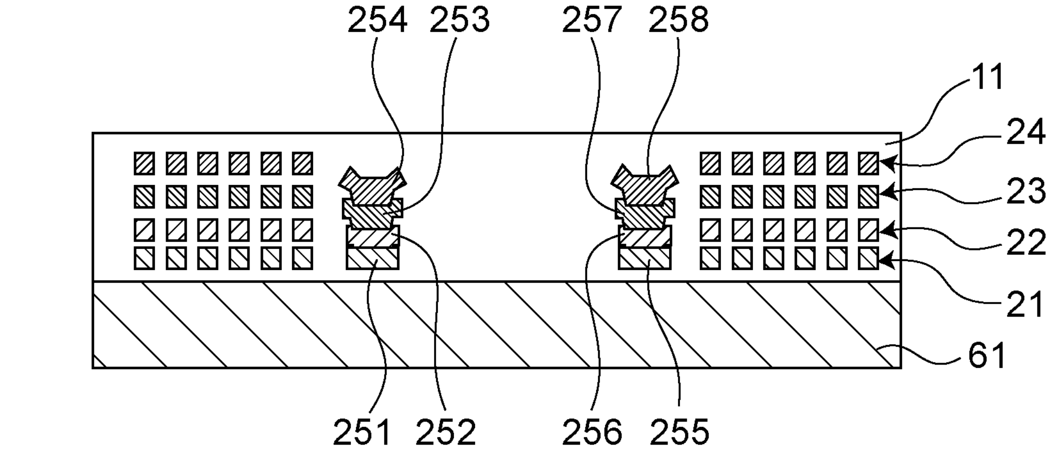
FIG. 9E is an explanatory view explaining the method of manufacturing an inductor component.

By repeating the above steps, as shown in FIG. 9E, the first to fourth coil wirings 21 to 24 and the first to eighth connection wirings 251 to 258 are disposed in the insulating layer 11. The lowest position of the upper surface of the fourth connection wiring 254 and the eighth connection wiring 258 in the uppermost layer in the lamination direction is formed to be lower than the position of the bottom surface of the winding part 241 in the fourth coil wiring 24 in the uppermost layer. In this case, the connection wirings located on the upper side in the lamination direction are controlled so that the depth of the concave portion disposed on the upper surface becomes deeper to form the first to eighth connection wirings 251 to 258. As a result, the height difference between the position of the winding part of the coil wiring in the lamination direction and the position in the lamination direction of the connection wiring connected to the coil wiring becomes larger as the coil wiring is located on the upper side in the lamination direction. Therefore, the inclination angle of the lead-out part becomes larger as the lead-out part is located on the upper side in the lamination direction.

Figure 9F:
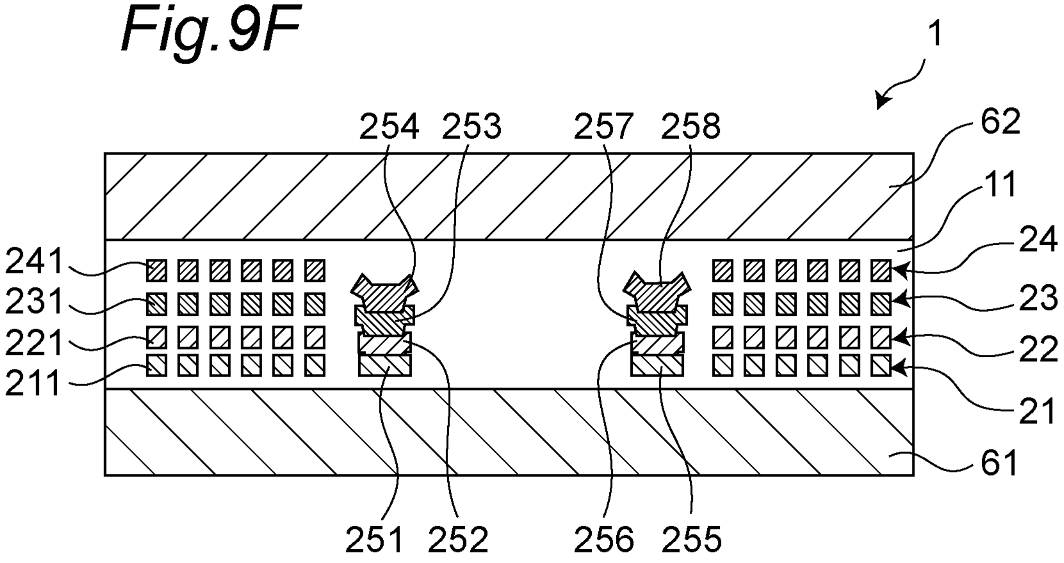
FIG. 9F is an explanatory view explaining the method of manufacturing an inductor component.

Subsequently, as shown in FIG. 9F, the second substrate 62 is laminated on the insulating layer 11 to manufacture the inductor component 1.

According to the inductor component 1, the first to fourth connection wirings 251 to 254 are arranged in the lamination direction (i.e., the first to fourth connection wirings 251 to 254 are arranged at the same position when viewed in the lamination direction), and the fifth to eighth connection wirings 255 to 258 are arranged in the lamination direction (i.e., the fifth to eighth connection wirings 255 to 258 are arranged at the same position when viewed in the lamination direction), so that a space on a plane for arranging the first to fourth coil wirings 21 to 24 can be increased. Therefore, the inductance acquisition efficiency can be improved.

Since the lowest position of the upper surface of the fourth connection wiring 254 and the eighth connection wiring 258 of the uppermost layer is lower than the position of the bottom surface of the winding part 241 in the fourth coil wiring 24 of the uppermost layer, the thickness of the insulating layer 11 on the fourth connection wiring 254 and the eighth connection wiring 258 in the uppermost layer is larger than the thickness of the insulating layer 11 on the winding part 241. This can suppress a decrease in the adhesion between the element body 10 and the second substrate 62 disposed on the element body 10, which may occur when multiple connection wirings are arranged in the lamination direction.

If the numbers of turns of the winding parts of the first to fourth coil wirings 21 to 24 are increased by utilizing the large space on the plane for arranging the first to fourth coil wirings 21 to 24 so as to maximize the size of the first to fourth coil wirings 21 to 24 on the plane, the line length of the lead-out part may be shortened, and the inductance acquisition efficiency may be lowered. According to the inductor component 1, the lead-out part 242 of the fourth coil wiring 24 in the uppermost layer is inclined relative to a plane orthogonal to the lamination direction. Therefore, the line length of the lead-out part 242 can be ensured, so that a decrease in the inductance acquisition efficiency can be suppressed.

Preferably, the thickness of the winding part located on the upper side in the lamination direction is thinner than the thickness of the winding part located on the lower side. For example, the thickness of the winding parts 211, 221, 231, 241 in the lamination direction becomes thinner in this order.

According to the configuration described above, the unevenness of the insulating layer 11 on the upper layer side can be suppressed.

Referring to FIGS. 3 and 4A again, preferably, the inductor component 1 further includes a first dummy wiring 31, a second dummy wiring 32, and a third dummy wiring 33 connected to the end portions of the winding parts. Specifically, the first dummy wiring 31 is connected to the end portion of the winding part 211 of the first coil wiring 21, the second dummy wiring 32 is connected to the end portion of the winding part 221 of the second coil wiring 22, and the third dummy wiring 33 is connected to the end portion of the winding part 231 of the third coil wiring. The first dummy wiring 31 extends from the end portion of the winding part 211 along the extending direction of the winding part 211. The second dummy wiring 32 extends from the end portion of the winding part 221 along the extending direction of the winding part 221. The third dummy wiring 33 extends from the end portion of the winding part 231 along the extending direction of the winding part 231. The first to third dummy wirings 31 to 33 do not constitute a current path. Specifically, in the first to third dummy wirings 31 to 33, the end portion on the side opposite to the side connected to the winding part is not connected to other wiring etc.

According to the configuration described above, since the first to third dummy wirings 31 to 33 are further disposed, a depression of the insulating layer 11 laminated on the first to third dummy wirings 31 to 33 is suppressed, and the disconnection of the coil wiring disposed above the dummy wiring can be suppressed.

Preferably, the dummy wiring is not connected to the fourth coil wiring 24 in the uppermost layer.

According to the configuration described above, the magnetic path can be widened by not disposing the dummy wiring corresponding to the fourth coil wiring 24 of the uppermost layer. Since no coil wiring etc. is disposed above the fourth coil wiring 24 in the uppermost layer, a possibility of disconnection of the coil wiring and the connection wiring is low even when the dummy wiring corresponding to the fourth coil wiring 24 is not disposed.

Preferably, the line length of the first dummy wiring 31 corresponding to the first coil wiring 21 in the lowermost layer is shorter than the line lengths of the second dummy wiring 32 and the third dummy wiring 33 corresponding to the second coil wiring 22 and the third coil wiring 23 other than the first coil wiring 21.

According to the configuration described above, the magnetic path can be widened by making the line length of the first dummy wiring 31 corresponding to the first coil wiring 21 of the lowermost layer relatively short. Since the insulating layer 11 laminated on the first coil wiring 21 in the lowermost layer has a smaller amount of depression as compared to the insulating layer 11 of the upper layer, the line length of the first dummy wiring 31 corresponding to the first coil wiring 21 in the lowermost layer may be minimal.

Second Embodiment

Figure 10:
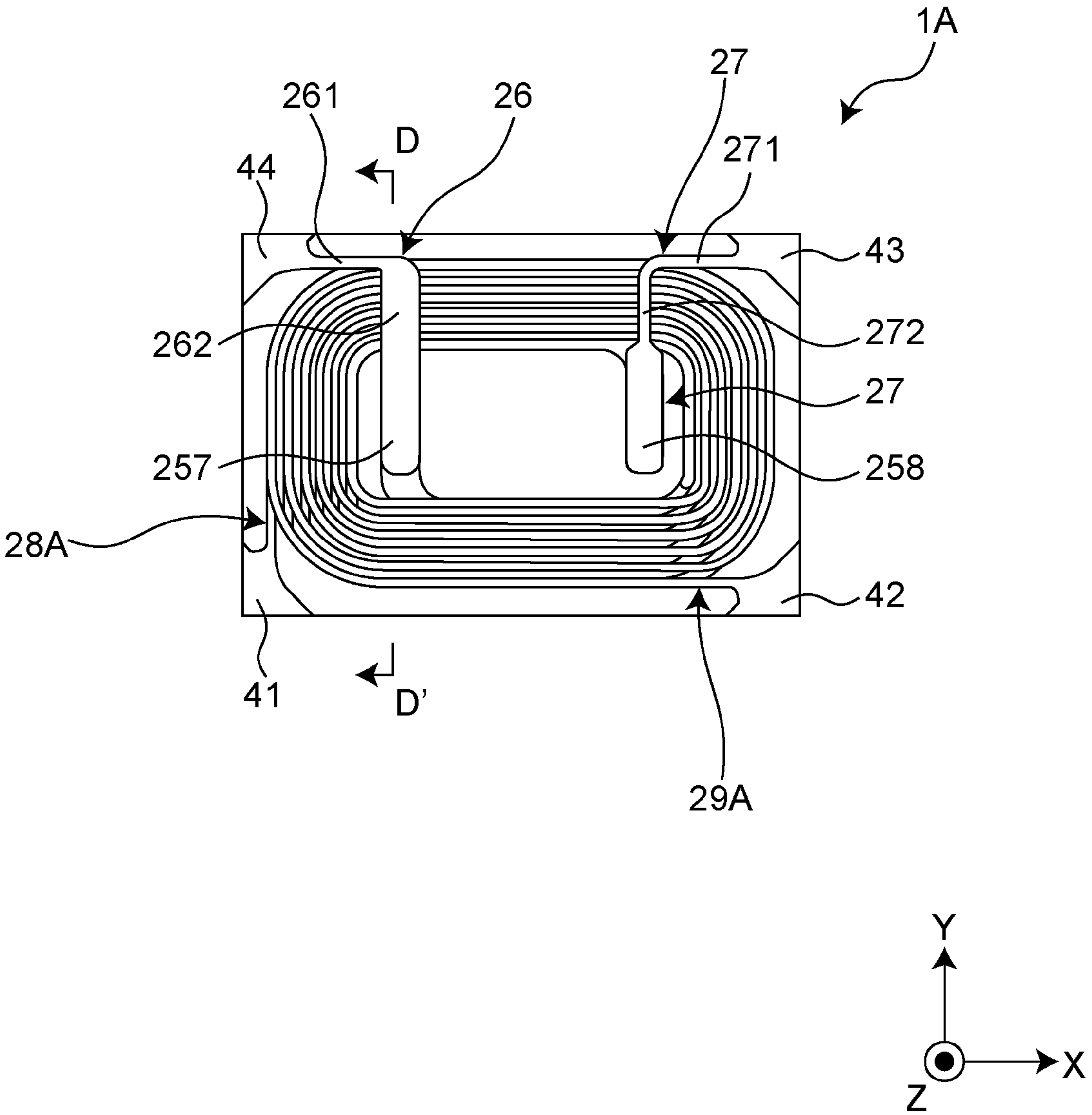
FIG. 10 is a transparent plan view showing a second embodiment of an inductor component.
Figure 11:
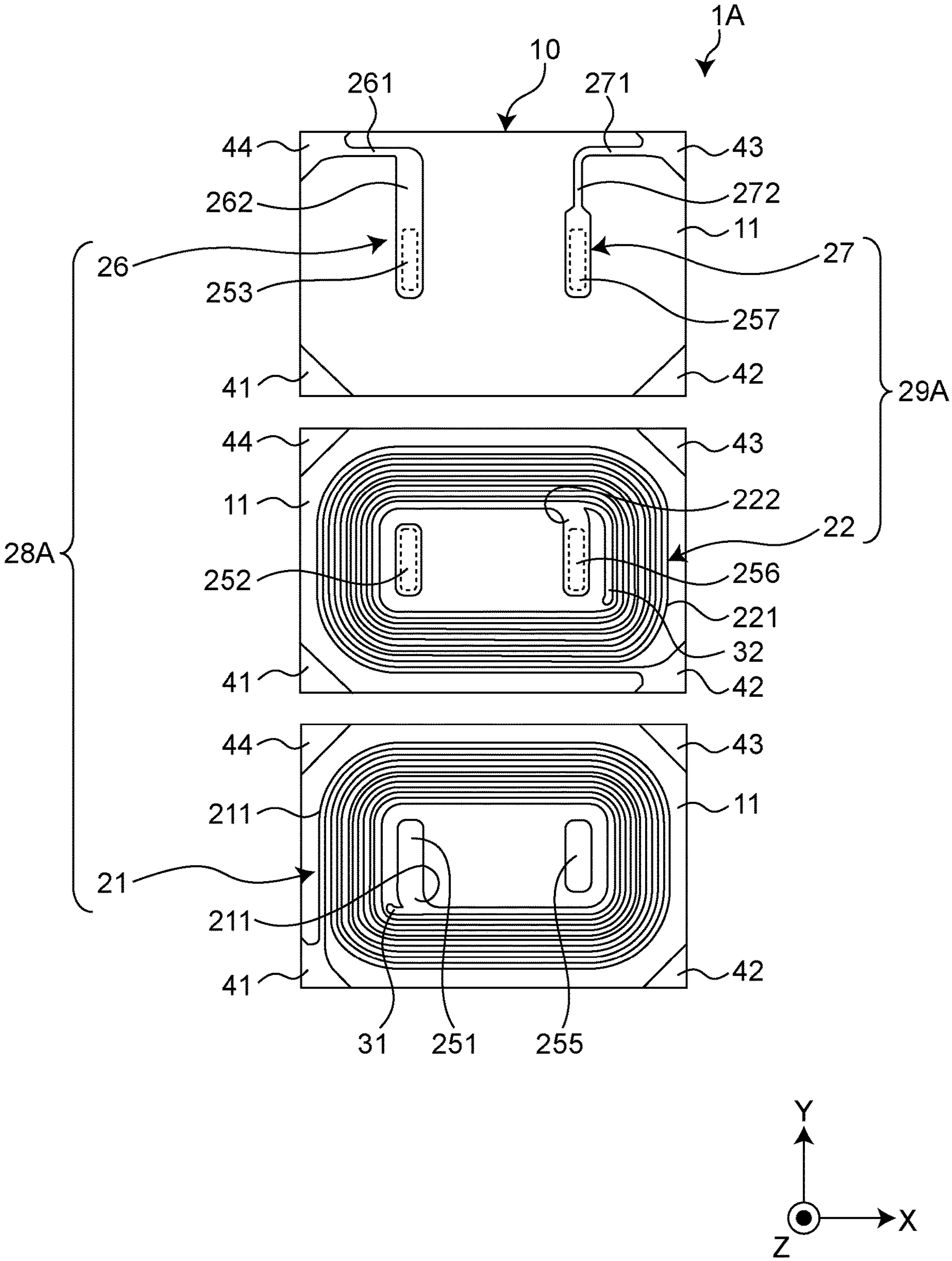
FIG. 11 is an exploded plan view of the inductor component.

FIG. 10 is a transparent plan view showing a second embodiment of the inductor component of the present disclosure. FIG. 11 is an exploded plan view showing the second embodiment of the inductor component of the present disclosure. The second embodiment is different from the first embodiment in the configurations of the first coil and the second coil. This different configuration will hereinafter be described. The other constituent elements have the same configuration as the first embodiment and are denoted by the same reference numerals as the first embodiment and will not be described.

As shown in FIGS. 10 and 11, an inductor component 1A of the second embodiment includes a first coil 28A and a second coil 29A.

The first coil 28A includes the first coil wiring 21 and the sixth coil wiring 26, and the first to third connection wirings 251 to 253. The first coil wiring 21 is arranged on the lower side of the sixth coil wiring 26 in the lamination direction. The sixth coil wiring 26 has a first end portion connected to the fourth connection electrode 44 and a second end portion connected to the third connection wiring 253. The sixth coil wiring 26 includes a winding part 261 and a lead-out part 262. The winding part 261 has the number of turns less than one and is specifically a straight line. The winding part 261 has a first end portion connected to the fourth connection electrode 44 and a second end portion connected to a first end portion of the lead-out part 262. A second end portion of the lead-out part 262 is connected to the third connection wiring 253. With the configuration described above, the first connection electrode 41, the first coil wiring 21, the first to third connection wirings 251 to 253, the sixth coil wiring 26, and the fourth connection electrode 44 are connected in this order, and the first coil 28A is electrically connected to the first connection electrode 41 and the fourth connection electrode 44.

The second coil 29A includes the second coil wiring 22 and a seventh coil wiring 27, and the sixth connection wiring 256 and a seventh connection wiring 257. The second coil wiring 22 is arranged on the lower side of the seventh coil wiring 27 in the lamination direction. The seventh coil wiring 27 has a first end portion connected to the third connection electrode 43 and a second end portion connected to the seventh connection wiring 257. The seventh coil wiring 27 includes a winding part 271 and a lead-out part 272. The winding part 271 has the number of turns less than one and is specifically a straight line. The winding part 271 has a first end portion connected to the third connection electrode 43 and a second end portion connected to a first end portion of the lead-out part 272. A second end portion of the lead-out part 272 is connected to the third connection wiring 253. With the configuration described above, the second connection electrode 42, the second coil wiring 22, the sixth connection wiring 256 and the seventh connection wiring 257, the seventh coil wiring 27, and the third connection electrode 43 are connected in this order, and the second coil 29A is electrically connected to the second connection electrode 42 and the third connection electrode 43. The width of the lead-out part 262 of the sixth coil wiring 26 is larger than the width of the lead-out part 272 of the seventh coil wiring 27.

Figure 12:
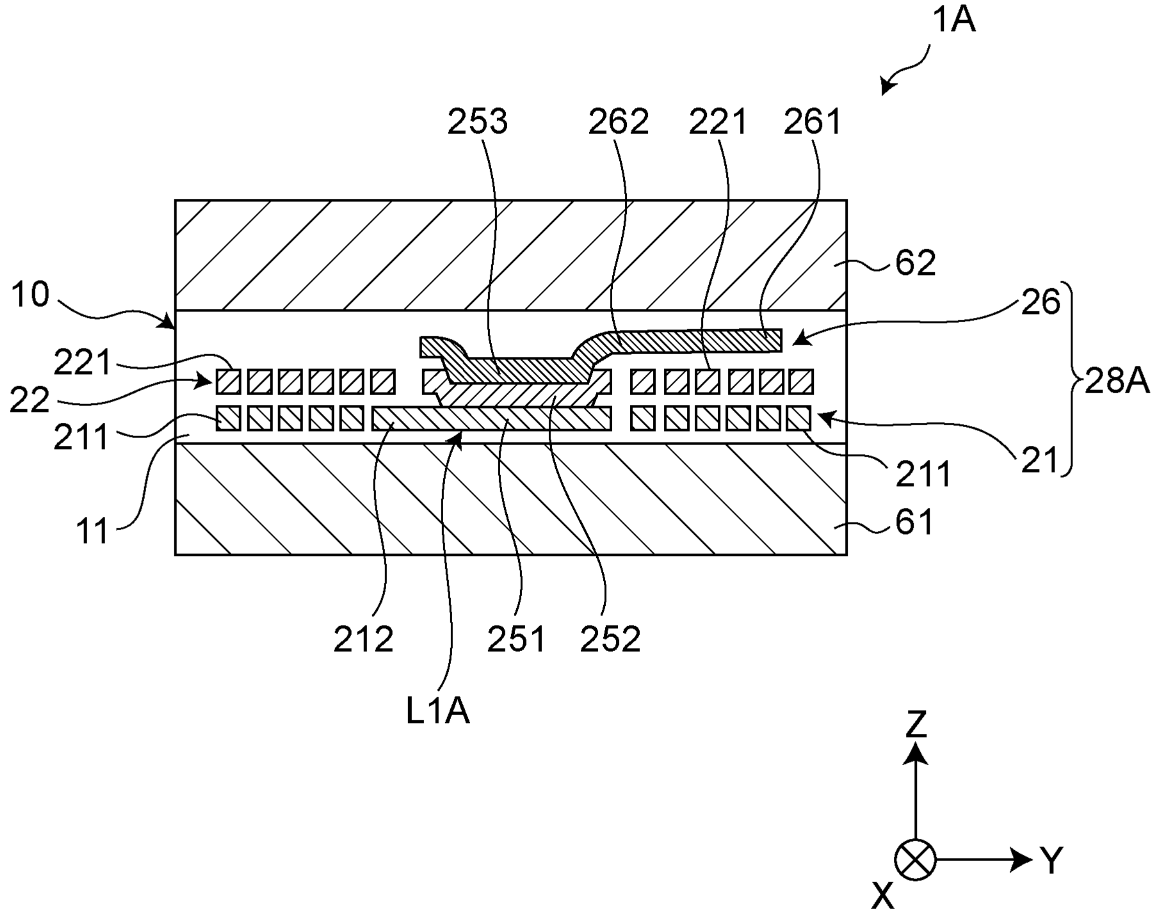
FIG. 12 is a cross-sectional view taken along a line D-D' of FIG. 10.

FIG. 12 is a cross-sectional view taken along a line D-D' of FIG. 10. As shown in FIG. 12, the first to third connection wirings 251 to 253 are laminated in this order from the lower side to the upper side in the lamination direction to form a laminated body L1A. The lead-out part 262 of the sixth coil wiring 26 is led out to the lower side in the lamination direction relative to the plane disposed with the winding part 261 and is connected to the third connection wiring 253 in the uppermost layer and inclined relative to the plane. Although not described in detail, as in the first embodiment, the lowest position of the upper surface of the third connection wiring 253 in the uppermost layer is lower than the position of the bottom surface of the winding part 261 of the sixth coil wiring 26 in the uppermost layer.

According to the inductor component 1A, the width of the lead-out part 262 of the sixth coil wiring 26 is larger than the width of the lead-out part 272 of the seventh coil wiring 27. As a result, the width of a portion of the coil wiring of the first coil 28A is different from the width of the coil wiring of the second coil 29A. Therefore, even if the line lengths of the first coil 28A and the second coil 29A are different, the characteristics of the first coil 28A and the second coil 29A can be matched.

Third Embodiment

Figure 13:
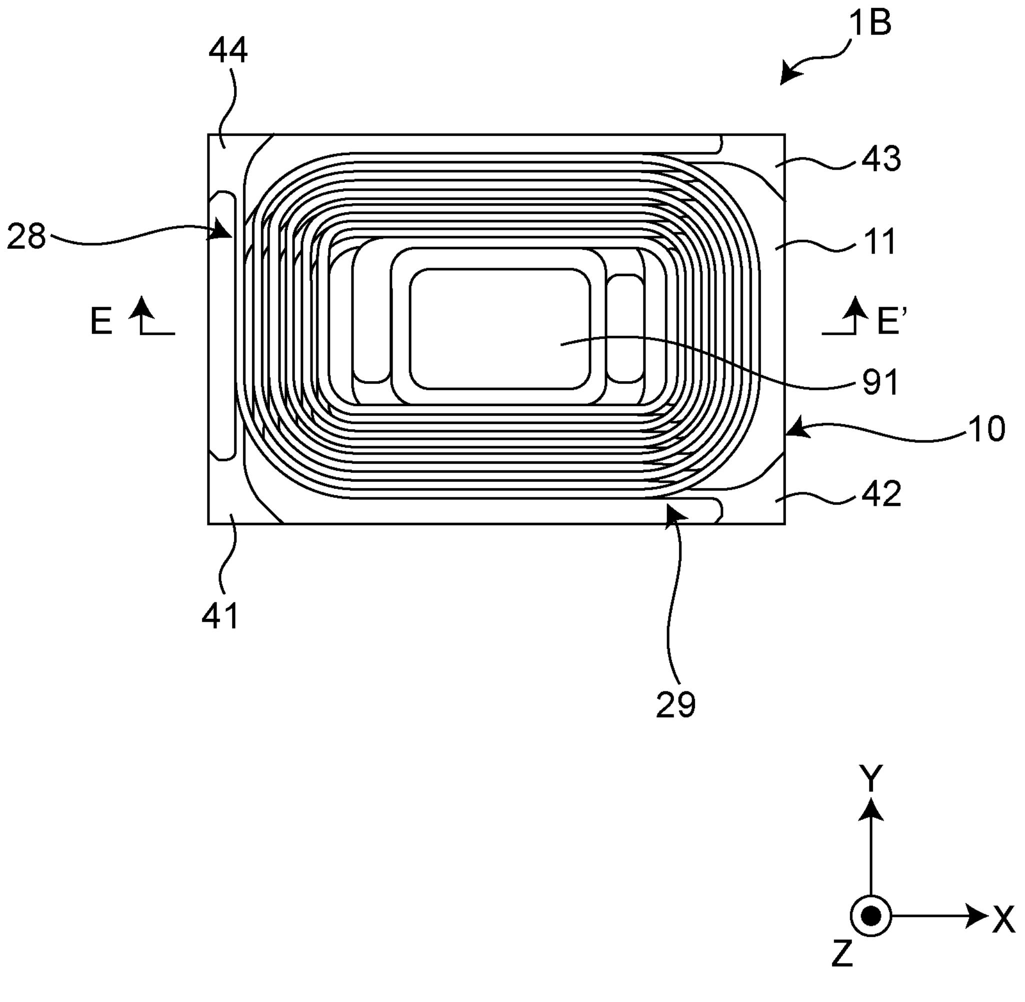
FIG. 13 is a transparent plan view showing a third embodiment of an inductor component.
Figure 14:
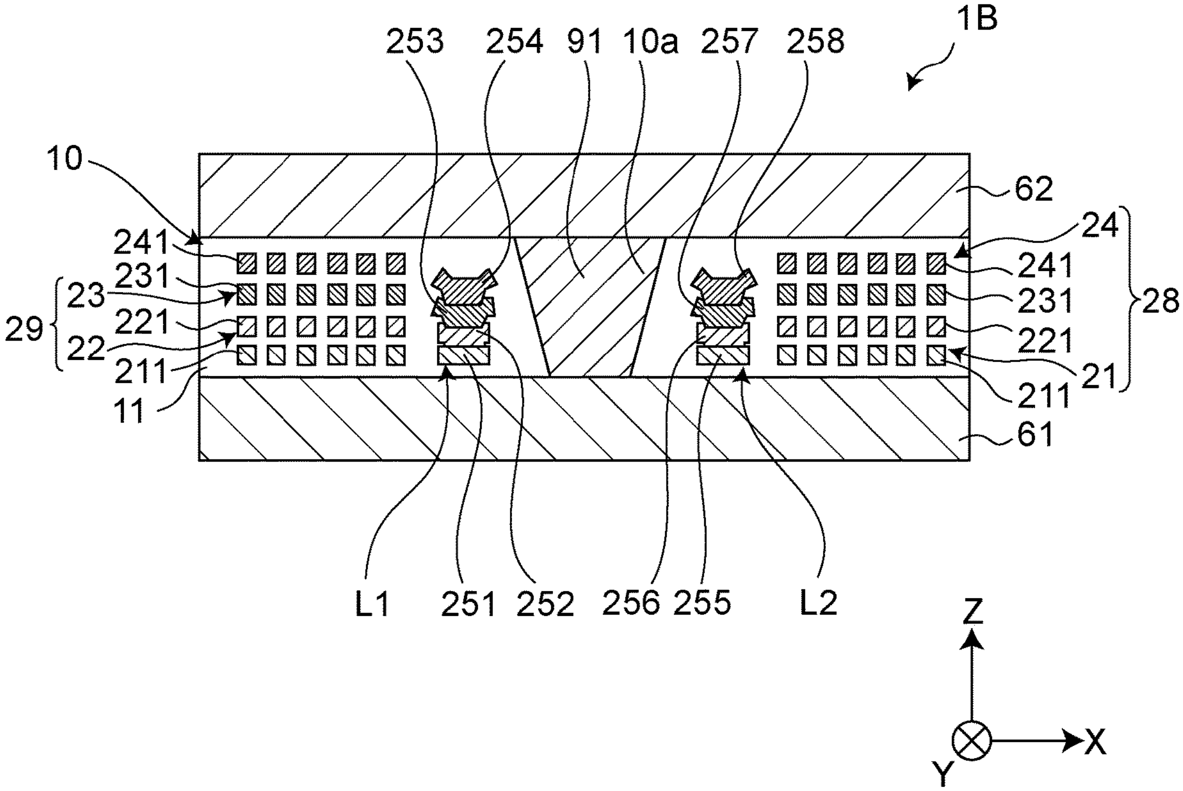
FIG. 14 is a cross-sectional view taken along a line E-E' of FIG. 13.

FIG. 13 is a transparent plan view showing a third embodiment of the inductor component of the present disclosure. FIG. 14 is a cross-sectional view taken along a line E-E of FIG. 13. The third embodiment is different from the first embodiment in that an internal magnetic path member is disposed. This different configuration will hereinafter be described. The other constituent elements have the same configuration as the first embodiment and are denoted by the same reference numerals as the first embodiment and will not be described.

As shown in FIGS. 13 and 14, the element body 10 of an inductor component 1B has a through-hole 10*a* penetrating in the lamination direction in a region radially inside the first coil 28 and the second coil 29. The radial inner side refers to the axial side relative to the inner surfaces of the first coil 28 and the second coil 29 when viewed in the lamination direction. An internal magnetic path member 91 constituting the internal magnetic path is disposed in the through-hole 10*a*. The internal magnetic path member 91 contains a magnetic material. Specifically, the internal magnetic path member 91 is made of a composite material of a metal magnetic powder and a resin. When the first substrate 61 and the second substrate 62 are magnetic substrates, the internal magnetic path member 91 contains a magnetic material different from at least one of the first substrate 61 and the second substrate 62. The phrase "the inner magnetic path member 91 contains a magnetic material different from the substrate" refers to the case that the magnetic material itself of the inner magnetic path member 91 is different from the substrate or that even if the inner magnetic path member 91 and the substrate are the same magnetic material, the substrate is a ferrite sintered body, for example, while the inner magnetic path member 91 is a resin body containing ferrite particles, for example, or that the inner magnetic path member 91 and the substrate are made of the same ferrite-based material, for example, and have compositions different from each other.

According to the inductor component 1B, the internal magnetic path member 91 is further included, so that the effective relative magnetic permeability becomes higher, and the inductance acquisition efficiency can be improved.

<First Modification>

Figure 15:
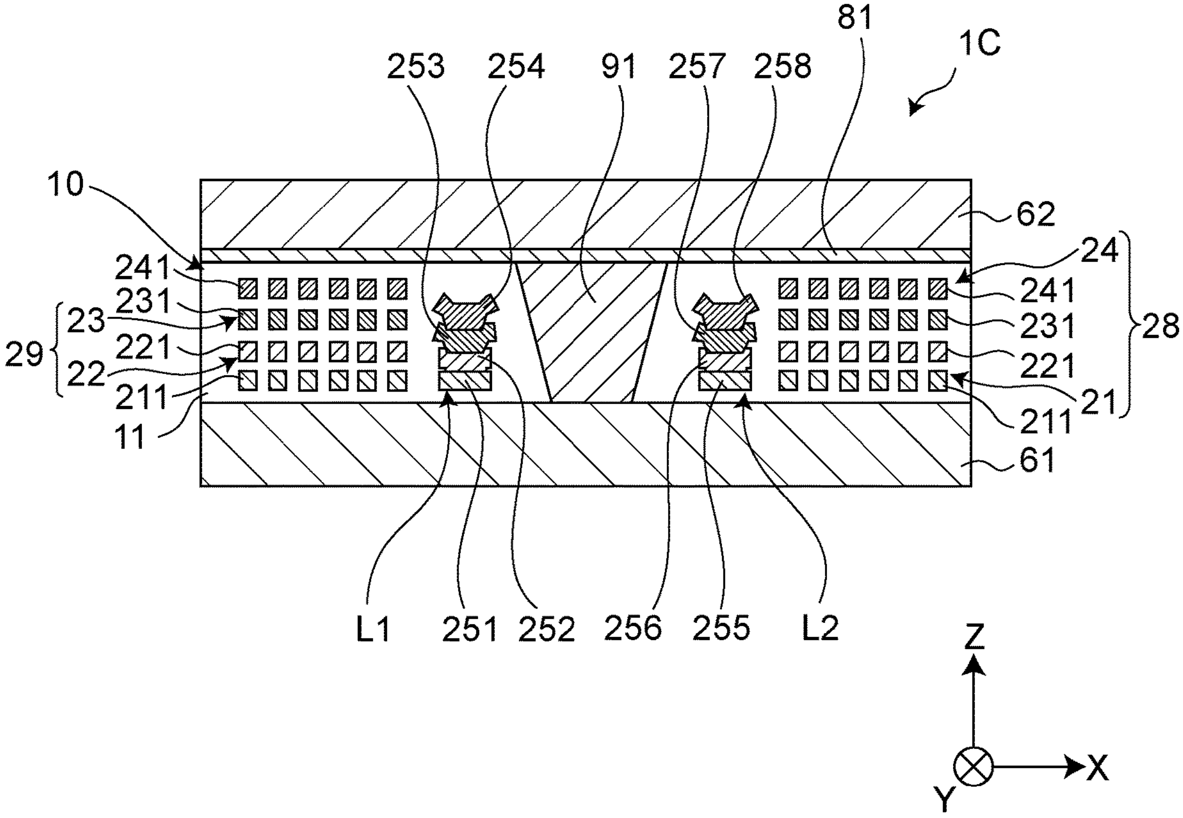
FIG. 15 is a cross-sectional view showing a modification of the third embodiment of the inductor component.

FIG. 15 is a cross-sectional view showing a first modification of the third embodiment of the inductor component. As shown in FIG. 15, an inductor component 1C includes a first adhesion layer 81 made of a composite material of a resin and a metal magnetic powder having an average particle size of ½ or less of the average particle size of the metal magnetic powder contained in the internal magnetic path member 91 between the winding part 241 of the fourth coil wiring 24 in the uppermost layer and the second substrate 62. Specifically, the first adhesion layer 81 is disposed on the upper surface of the element body 10. The first adhesion layer 81 causes the element body 10 to adhere to the second substrate 62. The resin contained in the first adhesion layer 81 is an insulating resin having adhesiveness. The "average particle size" refers to an average particle size D50 (particle size equivalent to a cumulative percentage of 50% on a volume basis) when three SEM images having a visual field region of 200 μm×200 μm are acquired. The second substrate 62 is disposed on the upper surface of the first adhesion layer 81.

According to the inductor component 1C, since the internal magnetic path member 91 is made of a composite material of a metal magnetic powder and a resin, the effective relative magnetic permeability becomes higher, and the inductance acquisition efficiency can be improved. Additionally, since the first adhesion layer 81 contains a resin, the adhesion between the second substrate 62 and the element body 10 can be improved.

<Second Modification>

Figure 16:
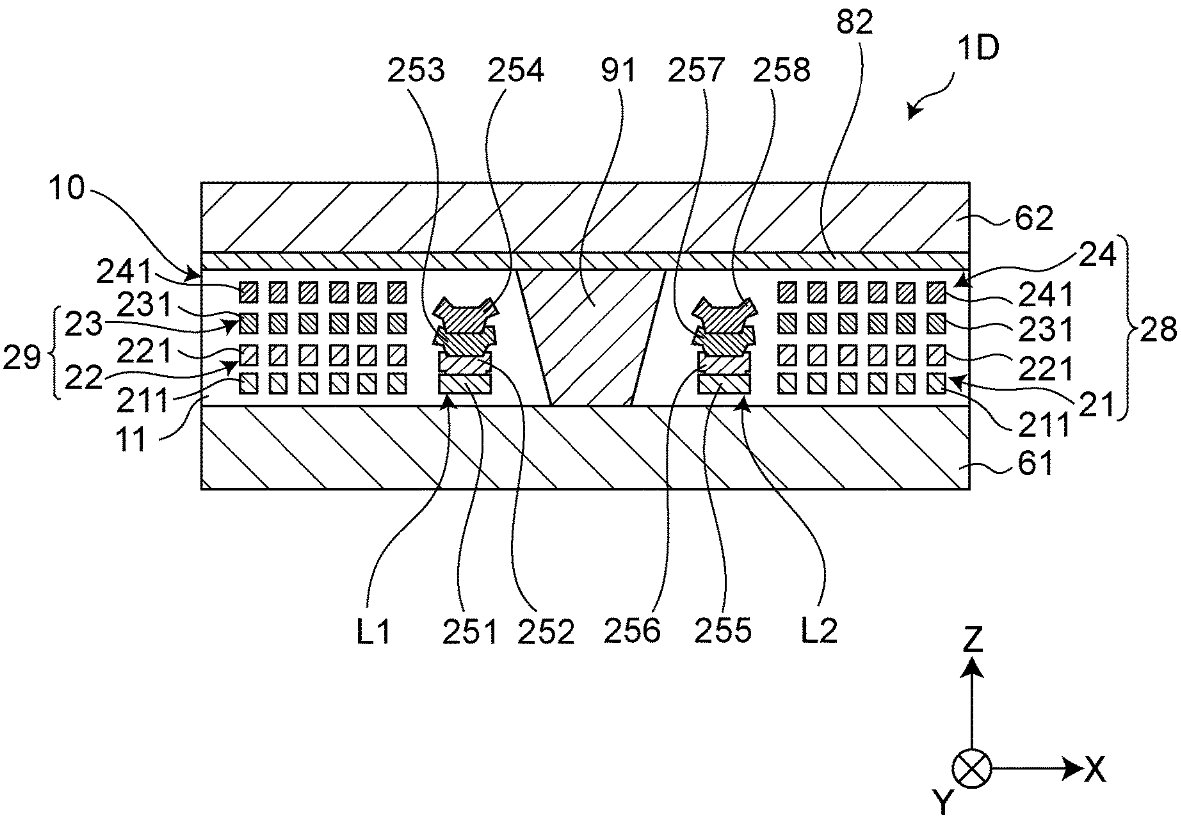
FIG. 16 is a cross-sectional view showing a modification of the third embodiment of the inductor component.

FIG. 16 is a cross-sectional view showing a second modification of the third embodiment of the inductor component. An inductor component 1D includes a second adhesion layer 82 between the winding part 241 of the fourth coil wiring 24 in the uppermost layer and the second substrate 62 in the lamination direction. Specifically, the second adhesion layer 82 is disposed on the upper surface of the element body 10. The second substrate 62 is disposed on the upper surface of the second adhesion layer 82. The second adhesion layer 82 causes the element body 10 to adhere to the second substrate 62. The second adhesive layer 82 is made of, for example, an insulating resin having adhesiveness.

According to the inductor component 1D, the adhesion between the second substrate 62 and the element body 10 can be improved.

<Third Modification>

Figure 17:
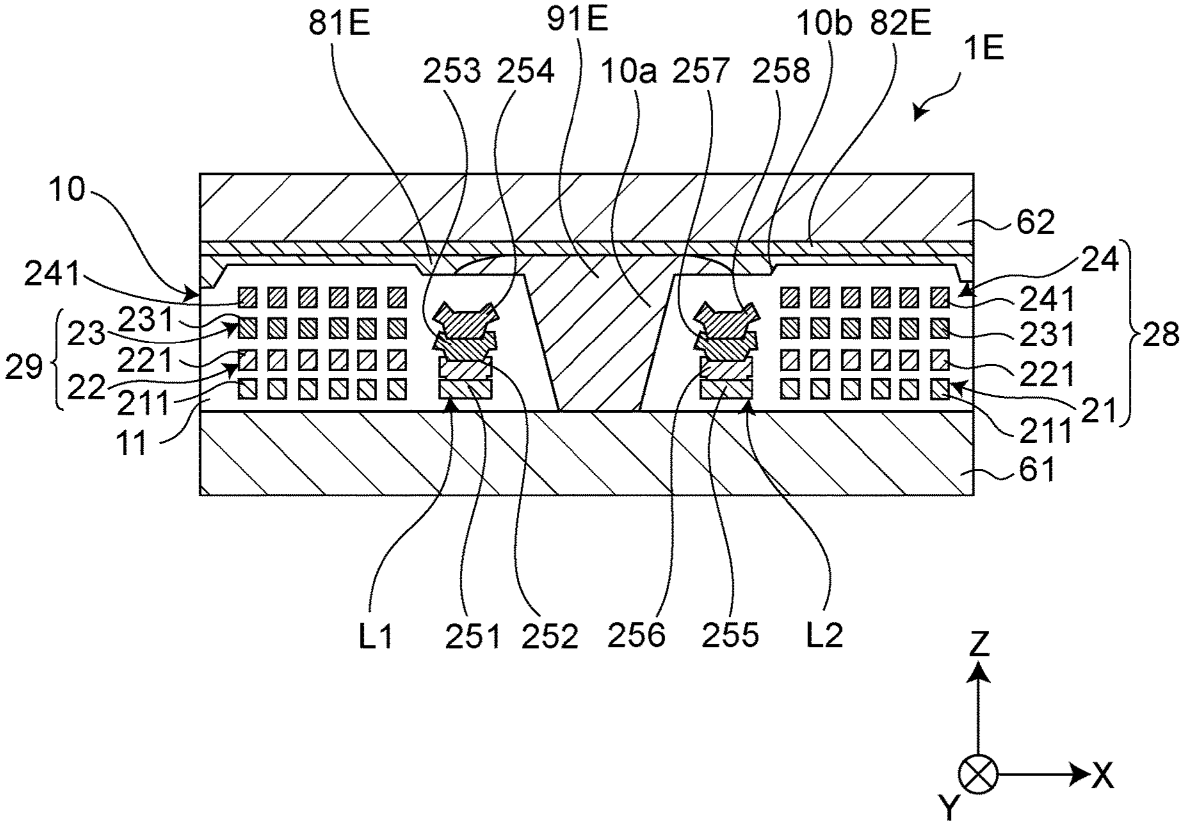
FIG. 17 is a cross-sectional view showing a modification of the third embodiment of the inductor component.

FIG. 17 is a cross-sectional view showing a third modification of the third embodiment of the inductor component. As shown in FIG. 17, a recess portion 10*b* is disposed in a predetermined range around the through hole 10*a* on the upper surface of the element body 10 of an inductor component 1E. A part of an upper portion of an internal magnetic path member 91E is disposed in the recess portion 10*b*. The shape of the internal magnetic path member 91E is a substantially T-shape when viewed in the direction orthogonal to the lamination direction. A first adhesion layer 81E is disposed on an upper surface of a region other than the region provided with the internal magnetic path member 91E on the upper surface of the element body 10. The first adhesion layer 81E is the same as the first adhesion layer 81 of the first modification. A second adhesion layer 82E is disposed on the upper surfaces of the internal magnetic path member 91E and the first adhesion layer 81E. The second adhesion layer 82E is the same as the second adhesion layer 82 of the second modification. The second substrate 62 is disposed on the upper surface of the second adhesion layer 82E.

According to the inductor component 1E, the adhesion between the second substrate 62 and the element body 10 can further be improved.

A method of manufacturing the inductor component 1E will be described with reference to FIGS. 18A to 18L.

Figure 18A:
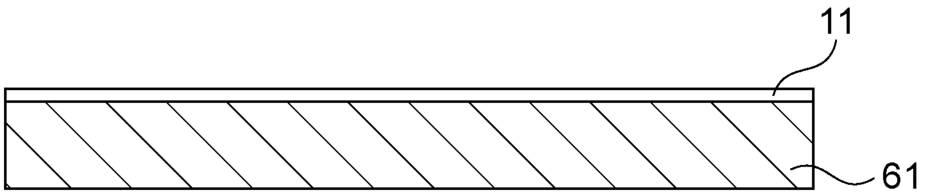
FIG. 18A is an explanatory view explaining a method of manufacturing an inductor component.
Figure 18B:
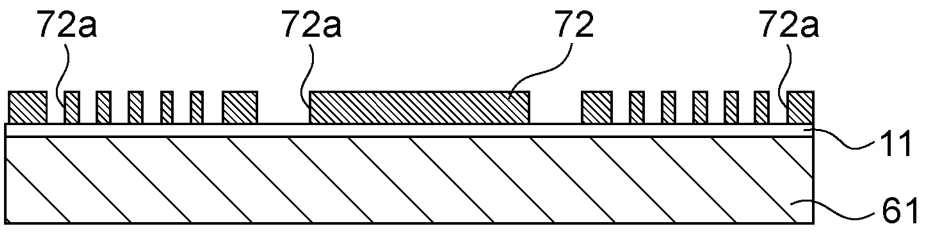
FIG. 18B is an explanatory view explaining the method of manufacturing an inductor component.
Figure 18C:
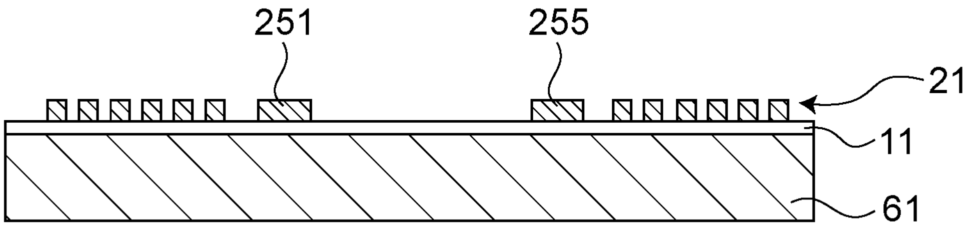
FIG. 18C is an explanatory view explaining the method of manufacturing an inductor component.
Figure 18D:
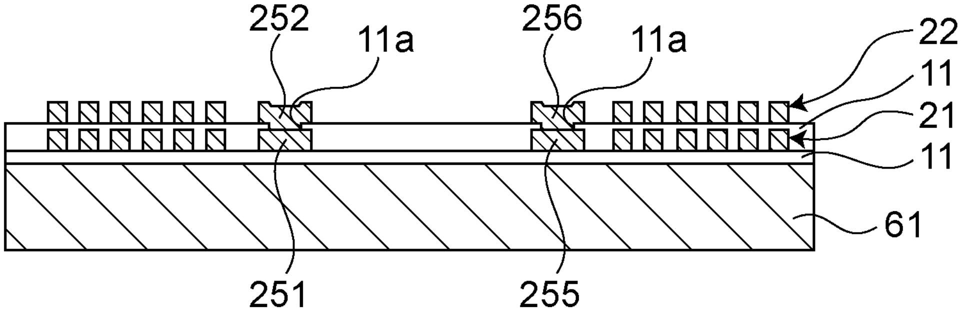
FIG. 18D is an explanatory view explaining the method of manufacturing an inductor component.
Figure 18E:
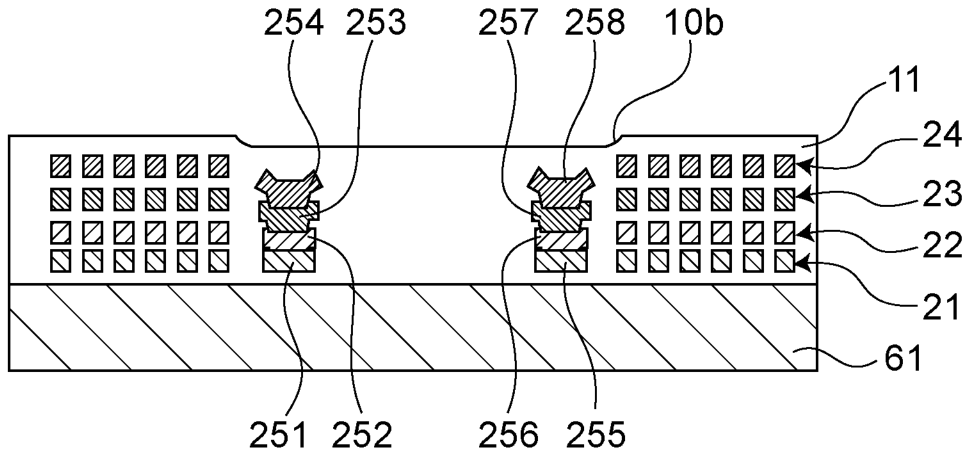
FIG. 18E is an explanatory view explaining the method of manufacturing an inductor component.

As shown in FIG. 18A, the insulating layer 11 is disposed on the first substrate 61. In this case, a conductive seed layer not shown is formed on the insulating layer 11 by a sputtering method etc. Subsequently, as shown in FIG. 18B, the photoresist 72 having the opening 72*a* formed by exposure and development is disposed on the insulating layer 11 including the seed layer. The photoresist 72 is a negative resist, for example Subsequently, as shown in FIG. 18C, while the first coil wiring 21, the first connection wiring 251, and the fifth connection wiring 255 are disposed in the opening 72*a* of the photoresist 72, the photoresist 72 is peeled off and the seed layer is removed by etching. As a result, the first coil wiring 21, the first connection wiring 251, and the fifth connection wiring 255 are laminated on the insulating layer 11. The first coil wiring 21, the first connection wiring 251, and the fifth connection wiring 255 are formed, for example, by electroplating with copper on the power-fed seed layer in the opening 72*a* of the photoresist 72. Subsequently, as shown in FIG. 18D, the insulating layer 11 having a via opening 11*a* formed therein is laminated on the first coil wiring 21, the first connection wiring 251, and the fifth connection wiring 255. The via opening 11*a* exposes a portion of the upper surface of the first connection wiring 251 and a portion of the upper surface of the fifth connection wiring 255. Subsequently, the second coil wiring 22, the second connection wiring 252, and the sixth connection wiring 256 are laminated on the insulating layer 11 so that the second connection wiring 252 and the sixth connection wiring 256 come into contact with the upper surfaces of the first connection wiring 251 and the fifth connection wiring 255. By repeating the above steps, as shown in FIG. 18E, the first to fourth coil wirings 21 to 24 and the first to eighth connection wirings 251 to 258 are disposed in the insulating layer 11. The recess portion 10*b* is formed on the upper surface of the element body 10. The recess portion 10*b* can be formed, for example, by reducing an application amount of the insulating material forming the insulating layer 11 in a central portion in the plane orthogonal to the lamination direction when the insulating layer 11 of the uppermost layer is disposed.

Figure 18F:
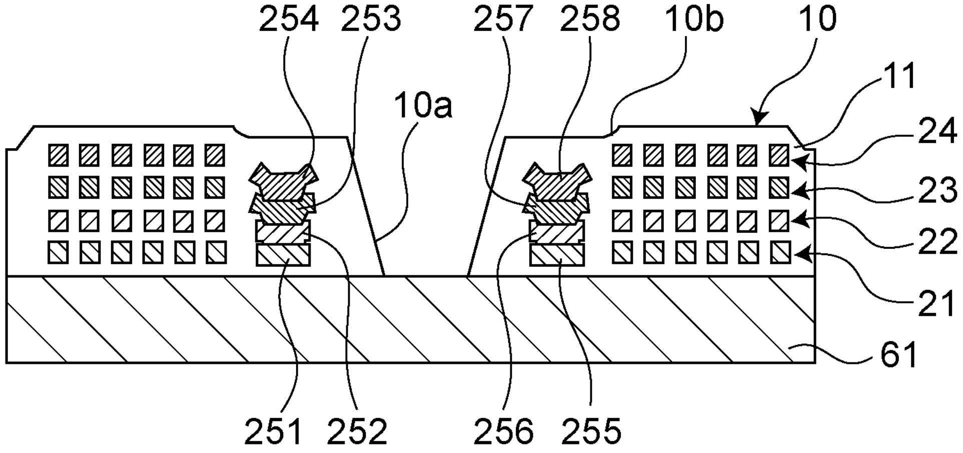
FIG. 18F is an explanatory view explaining the method of manufacturing an inductor component.
Figure 18G:
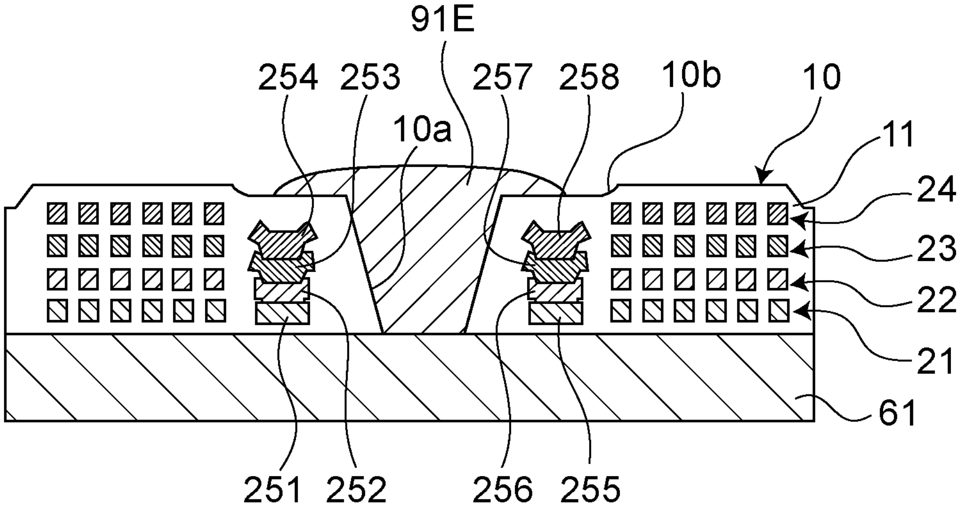
FIG. 18G is an explanatory view explaining the method of manufacturing an inductor component.
Figure 18H:
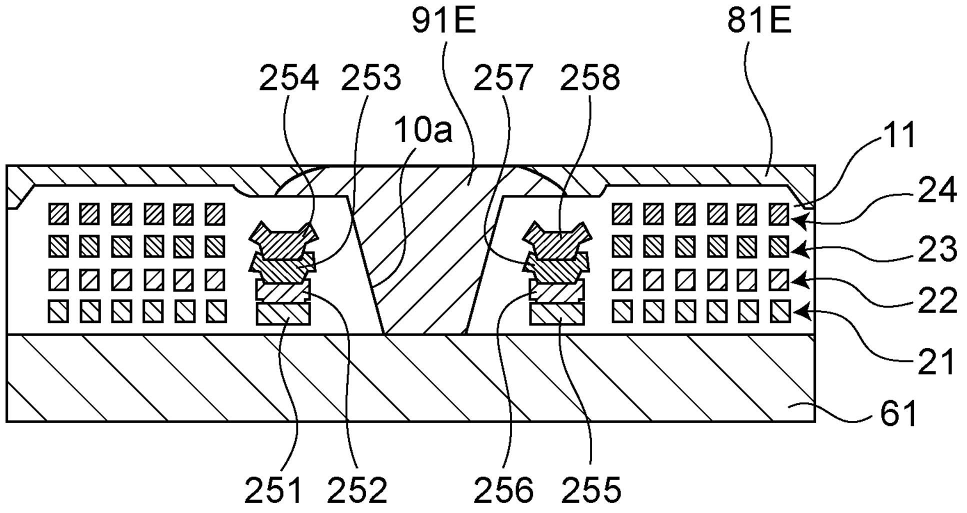
FIG. 18H is an explanatory view explaining the method of manufacturing an inductor component.
Figure 18J:
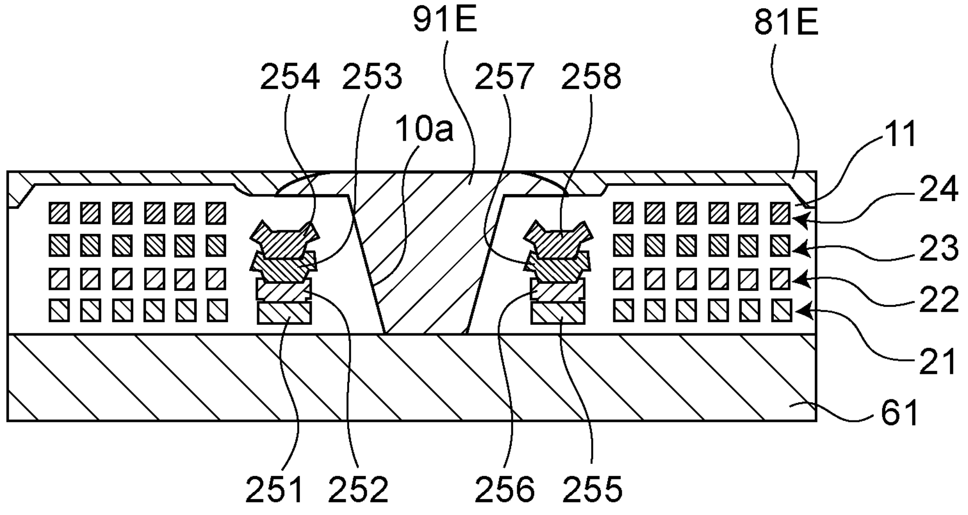
FIG. 18J is an explanatory view explaining the method of manufacturing an inductor component.
Figure 18K:
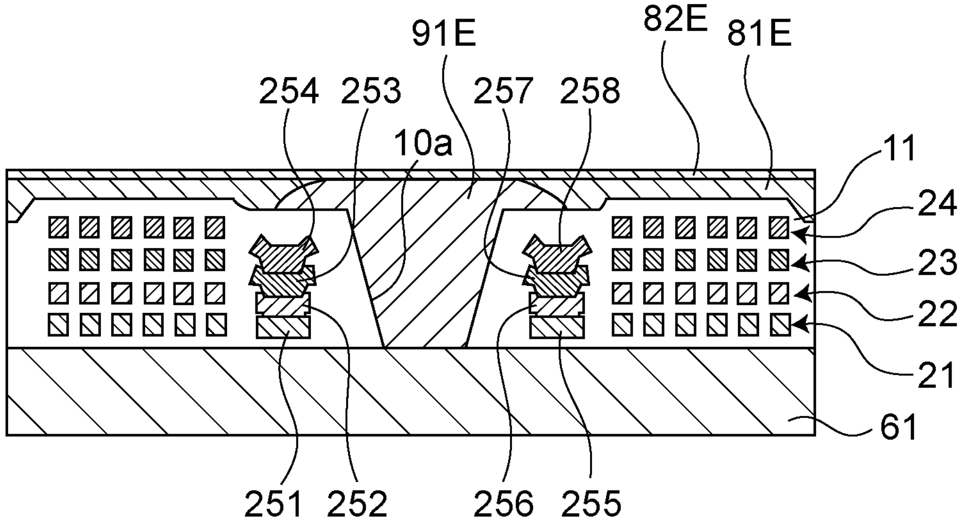
FIG. 18K is an explanatory view explaining the method of manufacturing an inductor component.
Figure 18L:
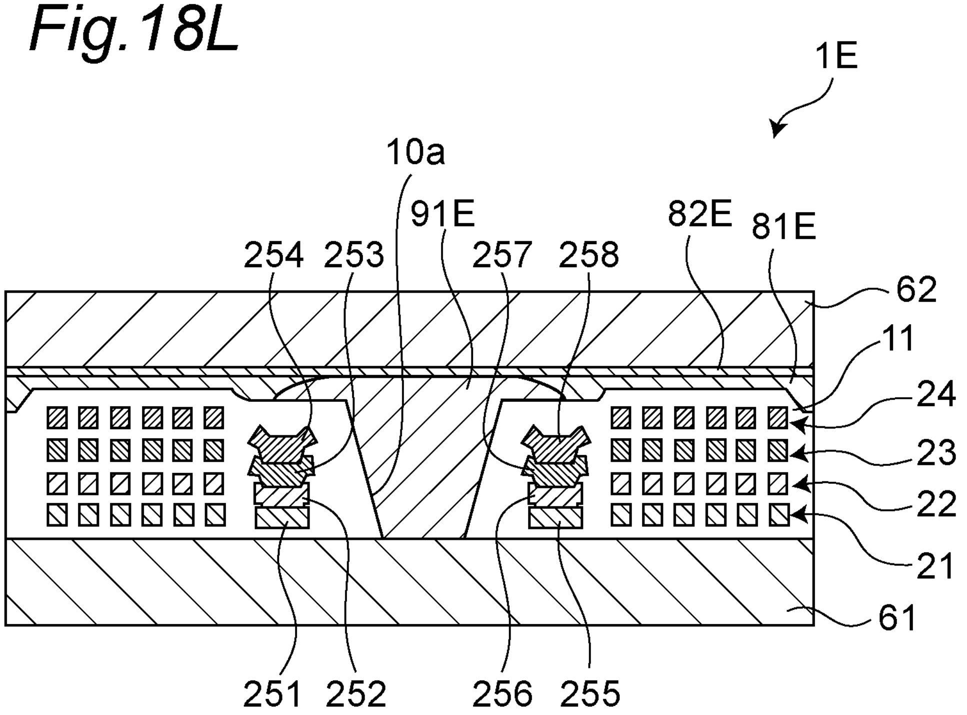
FIG. 18L is an explanatory view explaining the method of manufacturing an inductor component.

Subsequently, as shown in FIG. 18F, the through-hole 10*a* is formed in the element body 10 by sandblasting, laser processing, etc. Subsequently, as shown in FIG. 18G, the internal magnetic path member 91E is disposed in the through-hole 10*a* and the recess portion 10*b*. Subsequently, as shown in FIG. 18H, the first adhesion layer 81E is laminated on an upper surface of a region other than the region provided with the internal magnetic path member 91E on the upper surface of the element body 10. Subsequently, as shown in FIG. 18J, the upper surfaces of the internal magnetic path member 91E and the first adhesion layer 81E are flattened by grinding etc. Subsequently, as shown in FIG. 18K, the second adhesion layer 82E is laminated on the first adhesion layer 81E and the inner magnetic path member 91E. Subsequently, as shown in FIG. 18L, the second substrate 62 is laminated on the second adhesion layer 82E to manufacture the inductor component 1E.

The present disclosure is not limited to the embodiments described above and may be changed in design without departing from the spirit of the present disclosure. For example, respective feature points of the first to third embodiments may variously be combined.

In the first embodiment, the number of layers of the coil wirings is four; however, the number of layers of the coil wirings may be one to three or may be five or more.

In the embodiments, the first substrate 61 is disposed on the lower surface of the element body 10; however, the first substrate 61 may not be disposed.

In the embodiments, the lead-out parts of the coil wirings other than the coil wiring of the lowermost layer are inclined relative to the plane orthogonal to the lamination direction; however, only the lead-out part of the coil wiring of the uppermost layer may be inclined.

What is claimed is:

1. An inductor component comprising:

an element body having a plurality of laminated insulating layers;

a coil disposed in the element body and wound into a helical shape advancing in a lamination direction of the insulating layers; and a substrate disposed on an upper surface of the element body, wherein the coil includes a plurality of coil wirings arranged along the lamination direction and wound along a plane orthogonal to the lamination direction, and a connection wiring connecting end portions of the plurality of coil wirings to each other, the coil wirings include a winding part wound on the plane and a lead-out part led out from an end portion of the winding part to the connection wiring, the connection wiring is one of a plurality of connection wirings arranged in the lamination direction, in the lamination direction, a lowest position of an upper surface of the connection wiring of the uppermost layer in the lamination direction is lower than a position of a bottom surface of the winding part in the coil wiring of the uppermost layer, and higher than a position of the bottom surface of the winding part in the coil wiring one layer below the uppermost layer in the lamination direction, and the lead-out part of the coil wiring of the uppermost layer is led out to the lower side in the lamination direction relative to the plane disposed with the winding part of the coil wiring of the uppermost layer and is connected to the connection wiring of the uppermost layer and inclined relative to the plane.

2. The inductor component according to claim 1, wherein the lead-out part of the coil wiring of the lowermost layer in the lamination direction is parallel to the plane, and the lead-out part of the coil wiring located in an upper layer in the lamination direction has a larger inclination angle relative to the plane.

3. The inductor component according claim 2, wherein the thickness of the insulating layer between the winding parts of the adjacent coil wirings is smaller than the thickness of the winding parts in the lamination direction.

4. The inductor component according to claim 2, wherein the width of the connection wiring is larger than the width of the winding part.

5. The inductor component according claim 1, wherein the thickness of the insulating layer between the winding parts of the adjacent coil wirings is smaller than the thickness of the winding parts in the lamination direction.

6. The inductor component according to claim 1, wherein the width of the connection wiring is larger than the width of the winding part.

7. The inductor component according to claim 1, wherein the coil is one of a plurality of coils,
the plurality of the connection wirings arranged in the lamination direction are connected to each other to configure a laminated body, and
each of the plurality of the coils has the laminated body.

8. The inductor component according to claim 7, wherein the plurality of the coils includes a first coil and a second coil having line lengths different from each other, and
the width of a portion of the coil wiring of the first coil is different from the width of the coil wiring of the second coil.

9. The inductor component according to claim 7, wherein the thickness of each of the laminated bodies is the same.

10. The inductor component according to claim 7, wherein
the plurality of the coils includes a first coil and a second coil,
in the first coil, the winding part of the coil wiring is spirally wound, and
a shortest distance between the winding part of the first coil and the laminated body of the second coil is larger than a distance between adjacent turns of the winding part of the first coil.

11. The inductor component according to claim 1, further comprising:
a dummy wiring connected to an end portion of the winding part, wherein
the dummy wiring extends from the end portion of the winding part along an extending direction of the winding part and does not constitute a current path.

12. The inductor component according to claim 11, wherein
the dummy wiring is not connected to the coil wiring of the uppermost layer.

13. The inductor component according to claim 11, wherein
the line length of the dummy wiring connected to the end portion of the winding part in the coil wiring of the lowest layer in the lamination direction is shorter than the line length of the dummy wiring connected to the end portion of the winding part in the coil wiring other than the coil wiring of the lowest layer.

14. The inductor component according to claim 1, wherein
the substrate is a magnetic substrate,
the element body includes a through-hole penetrating in the lamination direction in a region radially inside the coil,
an internal magnetic path member disposed in the through-hole and constituting an internal magnetic path is further included, and
the internal magnetic path member contains a magnetic material different from the substrate.

15. The inductor component according to claim 14, wherein
the internal magnetic path member is made of a composite material of a metal magnetic powder and a resin, and
an adhesion layer made of a composite material of a resin and a metal magnetic powder having an average particle size of ½ or less of the average particle size of the metal magnetic powder in the internal magnetic path member is included between the winding part of the coil wiring of the uppermost layer and the substrate in the lamination direction.

16. The inductor component according to claim 14, further comprising:
a substrate disposed on a lower surface of the element body and having a thickness greater than that of the substrate.

17. The inductor component according to claim 1, wherein
the thickness of the winding part located on the upper side in the lamination direction is thinner than the thickness of the winding part located on the lower side.

18. An inductor component comprising:
an element body having a plurality of laminated insulating layers;
a coil disposed in the element body and wound into a helical shape advancing in a lamination direction of the insulating layers; and
a substrate disposed on an upper surface of the element body, wherein
the coil includes a plurality of coil wirings arranged along the lamination direction and wound along a plane orthogonal to the lamination direction, and a connection wiring connecting end portions of the plurality of coil wirings to each other,
the coil wirings include a winding part wound on the plane and a lead-out part led out from an end portion of the winding part to the connection wiring,
the connection wiring is one of a plurality of connection wirings arranged in the lamination direction,
in the lamination direction, a lowest position of an upper surface of the connection wiring of the uppermost layer in the lamination direction is lower than a position of a bottom surface of the winding part in the coil wiring of the uppermost layer, and
the lead-out part of the coil wiring of the uppermost layer is led out to the lower side in the lamination direction relative to the plane disposed with the winding part of the coil wiring of the uppermost layer and is connected to the connection wiring of the uppermost layer and inclined relative to the plane,
the inductor component further comprising:
a dummy wiring connected to an end portion of the winding part, wherein
the dummy wiring extends from the end portion of the winding part along an extending direction of the winding part and does not constitute a current path.

* * * * *